US012595338B2

(12) United States Patent
Bruchmann et al.

(10) Patent No.: US 12,595,338 B2
(45) Date of Patent: Apr. 7, 2026

(54) PROCESS FOR PREPARING A HYDROXY GROUP FUNCTIONALIZED THIOETHER

(71) Applicant: BASF SE, Ludwigshafen am Rhein (DE)

(72) Inventors: Bernd Bruchmann, Ludwigshafen (DE); Peter Rudolf, Ludwigshafen (DE); Markus Meise, Ludwigshafen (DE); Elliot Christ, Freiburg (DE); Juergen Ruehe, Eichstetten am Kaiserstuhl (DE); Tassilo Gleede, Freiburg (DE)

(73) Assignee: BASF SE, Ludwigshafen am Rhein (DE)

( * ) Notice: Subject to any disclaimer, the term of this patent is extended or adjusted under 35 U.S.C. 154(b) by 601 days.

(21) Appl. No.: 18/018,534

(22) PCT Filed: Jul. 23, 2021

(86) PCT No.: PCT/EP2021/070659

§ 371 (c)(1),
(2) Date: Jan. 27, 2023

(87) PCT Pub. No.: WO2022/023196

PCT Pub. Date: Feb. 3, 2022

(65) Prior Publication Data

US 2023/0340205 A1 Oct. 26, 2023

(30) Foreign Application Priority Data

Jul. 30, 2020 (EP) .................................... 20188725

(51) Int. Cl.
*C08G 75/045* (2016.01)

(52) U.S. Cl.
CPC .................................. *C08G 75/045* (2013.01)

(58) Field of Classification Search
CPC ........ C08G 75/045; C08G 75/28; C08L 81/04
See application file for complete search history.

(56) References Cited

U.S. PATENT DOCUMENTS 3,326,977 A * 6/1967 Johnson .................. G03C 5/39 568/45
4,551,419 A 11/1985 Sugimoto et al.
2022/0185773 A1* 6/2022 Rudolf .................. C07C 319/02

FOREIGN PATENT DOCUMENTS

JP H09-286772 A 11/1997
JP 2009-203416 A 9/2009

OTHER PUBLICATIONS

A. D. B. Sloan, "Glycols With Long Thioethylene Chains", Chemistry & Industry , vol. 16, Apr. 22, 1967, p. 660.

European Search Report for EP Patent Application No. 20188725.4, Issued on Dec. 15, 2020. 3 pages.

H. Naarmann, "Problems incurred in stabilizing polymers against oxidative degradation. Model studies on active functional groups in the polymer substrate and new inhibitors", Pure and Applied Chemistry, vol. 36, Issue 1-2, 1973, pp. 253-274.

International Search Report for PCT Patent Application No. PCT/EP2021/070659 , Issued on Dec. 9, 2021, 4 pages.

Odhiambo, et al., "Synthesis, characterisation and ion-binding properties of oxathiacrown ethers appended to [Ru (bpy) 2] 2+. Selectivity towards Hg 2+, Cd 2+ and Pb 2+", RSC advances, vol. 8, Issue 7, Jan. 17, 2018, pp. 3663-3672.

Shostakovskii, et al., "Synthesis of sulfur compounds based on vinyl ethers and acetylene", Database CAPLUS [Online], Chemical Abstracts Service, retrieved from STN Database accession No. 1959:23259, XP002801317, Nov. 16, 2016, 1 page.

Tanaka, et al., "Synthesis and metal-ion binding properties of monoazathiacrown ethers", The Journal of organic chemistry, vol. 66, Issue 21, Sep. 18, 2001, pp. 7008-7012.

Wolf, et al., "Crown thioether chemistry: Structural and conformational studies of tetrathia-12-crown-4, pentathia-15-crown-5, and hexathia-18-crown-6. Implications for ligand design", Journal of the American Chemical Society, vol. 109, Issue 14, Jul. 1, 1987, pp. 4328-4335.

International Preliminary Report on Patentability for PCT Patent Application No. PCT/EP2021/070659 , Issued on Feb. 9, 2023, 7 pages.

Written Opinion for PCT Patent Application No. PCT/EP2021/070659, Issued on Dec. 9, 2021, 5 pages.

Williams, et al., "New Organic Sulphur Vesicants. Part II. Anawgues of 2: 2'-Dichlorodiethyl Sulphide and 2 :2'-Di-(2-cltloroethylthio)die,thyl Ether", Journal of the Chemical Society, 1947, vol. 1948, pp. 38-42.

* cited by examiner

*Primary Examiner* — Shane Fang
(74) *Attorney, Agent, or Firm* — Grüneberg Global IP, PLLC

(57) ABSTRACT

A process can be used for preparing a compound A having n groups of formula (I)

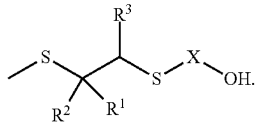

In Formula (I), X is $C_2$-$C_{12}$-alkylene or $C_2$-$C_{12}$-alkylene substituted with $C_1$-$C_4$-alkoxy, $C_1$-$C_4$-alkylthio, and/or interrupted with O or S; $R^1$, $R^2$, and $R^3$ are independently of one another hydrogen or $C_1$-$C_4$-alkyl; and n is an integer of 1, 2, 3, 4, 5, or 6. The process involves reacting a compound B having n —SH groups with a compound C of formula (II)

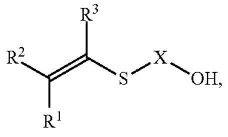

in the presence of a free radical generator.

20 Claims, No Drawings

PROCESS FOR PREPARING A HYDROXY GROUP FUNCTIONALIZED THIOETHER

CROSS-REFERENCE TO RELATED APPLICATIONS

This application is a National Stage entry under § 371 of International Application No. PCT/EP2021/070659, filed on Jul. 23, 2021, and which claims the benefit of priority to European Application No. 20188725.4, filed on Jul. 30, 2020. The content of each of these applications is hereby incorporated by reference in its entirety.

DESCRIPTION BACKGROUND OF THE INVENTION

Field of the Invention

The present invention relates to a process for preparing a compound A comprising a thioether group and a hydroxy group by reacting a thiol with an alkenyl group-containing thioether-alcohol in the presence of a free radical generator. Further, the present invention relates to a compound having one or more groups derived from an alkenyl group-containing thioether alcohol and to the use of a polyfunctional compound A as a chain extender or as a cross-linking agent.

Description of Related Art

Structures having two or more hydroxy functions may be suitably used as building blocks in the field of polyaddition reactions or polycondensation reactions, especially for plastics or resins based on polyethers, polyesters, polycarbonates and polyurethanes.

Difunctional compounds may be used as linear building blocks, for example, as a chain extender, as a part of a hard segment or as a part of a soft segment. Higher functional compounds may be generally used as a cross-linking agent.

Sulfur-containing compounds and notably sulfur-containing oligomers and polymers are of interest in many technical applications. Introducing sulfur atoms, for example, in form of thioether groups, into di- and higher functional alcohols increases the attractiveness of hydroxy-containing building blocks due to advantageous properties of sulfur atoms. For example, this allows for preparing polymers having improved chemical and thermal stability or having an increased refractive index which is specifically of advantage in the field of optical applications. Furthermore, thioether groups allow chemical modifications to fine-tune polymer properties such as polarity and solubility.

Thiadiols may generally be prepared by treating dithiols with sodium metal, followed by adding 2-chloroethanol. Such methods are described, for example, in R. A. Odhiambo et al., RSC Adv., 2018, 8, 3663-3672, or R. E. Wolf et al., J. Am. Chem. Soc. 1987, 109, 4328-4335, for the synthesis of 3,6-dithiaoctane-1,8-diol.

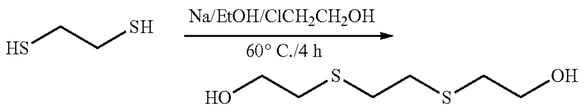

3,6,9-Trithiaundecane-1,11-diol may be prepared similar to the procedure using 3-thiapentane-1,5-dithiol in place of ethane-1,2-dithiol.

In order to prepare 3,6,9,12-tetrathiatetradecane-1,14-diol, 3,6-dithiaoctane-1,8-diol was first converted to the corresponding dithiol using thiourea, followed by addition of 2-chloroethanol, as described herein-before (R. A. Odhiambo et al., RSC Adv., 2018, 8, 3663-3672; M. Tanaka et al., J. Org. Chem. 2001, 66, 7008-7012). Said thiadiols are described to be used for the synthesis of thiacrown ethers.

These procedures are elaborate, and the use of sodium metal or chlorine-containing materials with release of chlorine-containing compounds and with salt formation should be avoided due to safety-related aspects and environmental restrictions.

JP 2009-203416 A discloses a thermo-conductive resin composition comprising 3,6,9-trithiaundecane-1,11-diol.

Glycols of following formula with v=3, 5 and 7 may also be prepared by reaction of divinyl sulfide and 2-mercaptoethanol or corresponding mercapto-alcohols, as described by A. D. B. Sloan, Chemistry and Industry, 1967, p. 666.

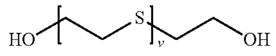

A synthesis of 3,6-dithiaoctane-1,8-dithiol is also mentioned in H. Naarmann, Pure Appl. Chem., 1973, 36(1-2), 267, wherein 2-mercaptoethanol is reacted with vinyl hydroxyethyl thioether. However, the melting point of 122° C. indicates that a different compound is formed. 3,6-dithiaoctane-1,8-dithiol has a melting point of 64° C.

There is still a need for an easily available synthetic route to a mono-, di- and polyhydroxy-containing polythioether starting from a thiol. The introduction of further thioether groups in alcohols allows for greater stability of such compounds since the initial terminal —SH function is substituted by a more stable —OH function. Thus, the tendency of the function —SH to oxidatively dimerize is eliminated.

Further, there is a need of a process for preparing a mono-, di- and polyhydroxy-containing polythioether which is able to avoid toxicological issues, allowing, for example, a more simple and faster registration.

SUMMARY OF THE INVENTION

Therefore, it is an object of the present invention to provide a process for preparing a hydroxy-containing polythioether, which is economic and flexible.

Further, it is an object of the present invention to provide a hydroxy-containing polythioether to be used as a building block in preparing a variety of polymers.

Further, it is an object of the present invention to provide a hydroxy-containing polythioether exhibiting an improved storage stability in the presence of air, allowing, for example, an easy and safe handling.

It has now been found that a hydroxy-containing polythioether may be easily prepared by reacting a thiol with an alkenyl group-containing thioether-alcohol. Especially, the process for preparing a di- or polyhydroxy-containing polythioether provides an easy access for building blocks, suitable for use in preparing a variety of polymers having improved properties like increased chemical stability and/or increased refractive index.

Accordingly, in a first aspect the invention relates to a process for preparing a compound A having n groups of formula

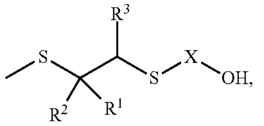

(I)

wherein

X is $C_2$-$C_{12}$-alkylene or $C_2$-$C_{12}$-alkylene substituted with $C_1$-$C_4$-alkoxy, $C_1$-$C_4$-alkylthio and/or interrupted with O or S;

$R^1$, $R^2$ and $R^3$ are independently of one another hydrogen or $C_1$-$C_4$-alkyl;

n is an integer of 1, 2, 3, 4, 5 or 6;

the process comprising a step of reacting a compound B having n —SH groups with a compound C of formula

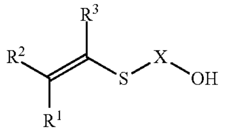

(II)

in the presence of a free radical generator.

In a further aspect, the invention relates to a compound A of formula

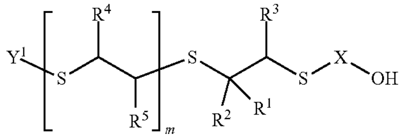

(III)

or

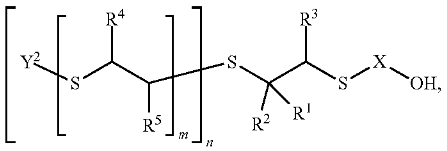

(IV)

wherein $Y^1$ is $C_1$-$C_{18}$-alkyl; $C_1$-$C_{18}$-alkyl substituted with OH, $C_1$-$C_4$-alkoxy, $C_1$-$C_4$-alkylthio, halogen, $NR^6R^7$, $C_3$-$C_{18}$-cycloalkyl, $C_6$-$C_{18}$-aryl or $C_2$-$C_{18}$-heteroaryl, and/or interrupted with —O—, —S—, —SO—, —$SO_2$—, —COO—, —OCOO— or —CO—, $C_3$-$C_{18}$-cycloalkylene, $C_6$-$C_{18}$-arylene or $C_2$-$C_{18}$-heteroarylene;

$C_3$-$C_{18}$-cycloalkyl; $C_3$-$C_{18}$-cycloalkyl substituted with OH, $C_1$-$C_4$-alkoxy, $C_1$-$C_4$-alkylthio, halogen or $NR^8R^9$ and/or interrupted by O or S;

$C_6$-$C_{18}$-aryl; $C_6$-$C_{12}$-aryl substituted with $C_1$-$C_{12}$-alkyl, OH, $C_1$-$C_4$-alkoxy, $C_1$-$C_4$-alkylthio, halogen, or $NR^{10}R^{11}$;

$C_2$-$C_{18}$-heteroaryl, $C_2$-$C_{18}$-heteroaryl substituted with $C_1$-$C_{12}$-alkyl, OH, $C_1$-$C_4$-alkoxy, $C_1$-$C_4$-alkylthio, halogen, or $NR^{12}R^{13}$;

X is $C_2$-$C_{12}$-alkylene or $C_2$-$C_{12}$-alkylene substituted with $C_1$-$C_4$-alkoxy, $C_1$-$C_4$-alkylthio and/or interrupted with O or S;

$R^1$, $R^2$ and $R^3$ are independently of one another hydrogen or $C_1$-$C_4$-alkyl; $R^4$ and $R^5$ are independently of one another and at each occurrence hydrogen, $C_1$-$C_{18}$-alkyl, $C_1$-$C_{18}$-alkyl substituted with halogen or interrupted with O or S; $C_6$-$C_{18}$-aryl or $C_6$-$C_{12}$-aryl substituted with $C_1$-$C_4$-alkyl, $C_1$-$C_4$-alkoxy, $C_1$-$C_4$-alkylthio, or halogen;

$R^6$, $R^7$, $R^8$, $R^9$, $R^{10}$, $R^{11}$, $R^{12}$ and $R^{13}$ are independently of one another and at each occurrence $C_1$-$C_4$-alkyl, $C_1$-$C_4$-alkyl substituted with OH, $C_1$-$C_4$-alkoxy, $C_1$-$C_4$-alkylthio or halogen; $C_6$-$C_{10}$-aryl or $C_6$-$C_{10}$-aryl substituted with OH, $C_1$-$C_4$-alkoxy, $C_1$-$C_4$-alkylthio or halogen;

or $R^6$ and $R^7$, $R^8$ and $R^9$, $R^{10}$ and $R^{11}$, or $R^{12}$ and $R^{13}$ together are $C_4$-$C_6$-alkylene or $C_4$-$C_6$-alkylene interrupted by O, S and/or $NR^{14}$;

$R^{14}$ is $C_1$-$C_4$-alkyl;

m is at each occurrence 1 to 12, preferably 1 to 10;

$Y^2$ is a n-valent linking group; and n is an integer of 2, 3, 4, 5 or 6, provided that $R^4$ and $R^5$ are not simultaneously H.

In a further aspect, the invention relates to a compound A of formula (IV), wherein $R^1$ and $R^2$ are hydrogen, and $R^3$ is hydrogen or $C_1$-$C_4$-alkyl; and X is $C_2$-$C_6$-alkylene or $C_2$-$C_6$-alkylene interrupted with O or S;

$R^4$ is hydrogen and $R^5$ is at each occurrence hydrogen, $C_1$-$C_4$-alkyl, $C_1$-$C_4$-alkyl substituted with halogen or interrupted with O or S; or phenyl;

$Y^2$ is a n-valent linking group;

m is 2 to 6, and n is an integer of 2, 3, 4, 5 or 6.

In a further aspect, the invention relates to the use of a compound of formula (IV) obtainable by a process as defined in any aspect herein, as a chain extender or as a cross-linking agent.

DETAILED DESCRIPTION OF THE INVENTION

The terms alkyl, alkylene, cycloalkyl, alkoxy, aryl, heteroaryl, halogen are known in the art and generally have the following meaning, if said groups are not further specified in specific embodiments mentioned below:

Alkyl, e.g., $C_1$-$C_{18}$-alkyl, $C_1$-$C_{12}$-alkyl, $C_1$-$C_4$-alkyl, $C_1$-$C_6$-alkyl or $C_2$-$C_{12}$-alkyl, may be within the given limits of carbon atoms linear or branched, where possible. Examples are methyl (Me), ethyl (Et), n-propyl, isopropyl, n-butyl, 1-methylpropyl, 2-methylpropyl, t-butyl, n-pentyl, 2-pentyl, 3-pentyl, 2,2-dimethylpropyl, n-hexyl, 1-methylhexyl, n-heptyl, 1,1,3,3-tetramethylbutyl, 1-methylheptyl, 3-methylheptyl, n-octyl, 2-ethylhexyl, n-nonyl, n-decyl, n-undecyl, n-dodecyl, n-tridecyl, n-tetradecyl, n-pentadecyl, n-hexadecyl, n-heptadecyl, n-octadecyl and constitutional isomers of the aforementioned n-alkyl radicals.

Alkylene, e.g., $C_1$-$C_{12}$-alkylene, $C_2$-$C_6$-alkylene, $C_2$-$C_4$-alkylene, $C_2$-$C_{12}$-alkylene or $C_4$-$C_6$-alkylene, may be derived from above-defined alkyl by abstracting a hydrogen atom from any terminal carbon atom of the alkyl. Examples are methylene, 1,2-ethandiyl, 1,1-ethandiyl, 1,1-propandiyl, 1,2-propandiyl, 2,2-propandiyl, 1,3-propandiyl, 2-methyl-2,3-propandiyl, 1,1-butandiyl, 1,2-butandiyl, 2,2-butandiyl, 2,3-butandiyl, 1,3-butandiyl, 1,4-butandiyl, 1,5-pentandiyl, 1,6-hexandiyl, 1,8-octandiyl, 1,10-decandiyl and 1,12-dodecandiyl.

Any alkyl or alkylene group of more than one, especially more than 2 carbon atoms, or such alkyl moieties which are part of another moiety may be interrupted by a hetero-function like —O—, —S—, —SO—, —$SO_2$, —COO—, —OCOO— or —CO—. They may be interrupted with one or more of these hetero-function groups, one group in each case being inserted, in general, into one C—C-bond of the alkyl or alkylene group. If the interrupted group is additionally substituted, the substituents are generally not at the heteroatom. If two or more interrupting groups of the type —O—, or —S— occur in one radical, they often are identical.

Cycloalkyl, e.g., $C_3$-$C_{18}$-cycloalkyl, $C_5$-$C_{12}$-cycloalkyl, $C_5$-$C_8$-cycloalkyl, $C_5$-$C_6$-cycloalkyl, include cycloalkyl groups which may be unsubstituted or substituted with alkyl groups. Examples are cyclopropyl, cyclobutyl, cyclopentyl, methylcyclopentyl, dimethylcyclo-pentyl, cyclohexyl, methylcyclohexyl, dimethylcyclohexyl, trimethylcyclohexyl, tert-butylcyclohexyl, butylcyclohexyl, hexylcyclohexyl, dodecylcyclohexyl, cycloheptyl, cyclooctyl, cyclononyl, cyclodecyl or cyclododecyl. Cyclohexyl and cyclopentyl are preferred, more preferred is cyclohexyl. Cycloalkyl, e.g., $C_3$-$C_{18}$-cycloalkyl which is interrupted by one or more O or S, preferably one O, is, for example, tetrahydropyranyl.

Cycloalkylene, e.g., $C_3$-$C_{18}$-cycloalkylene, $C_6$-$C_8$-cycloalkylene, $C_5$-$C_{12}$-cycloalkylene, $C_5$-$C_8$-cycloalkylene, may be derived from above-defined cycloalkyl by abstracting a hydrogen atom from any ring carbon atom.

Alkoxy, e.g., $C_1$-$C_4$-alkoxy, is alkyl-O.

Alkylthio, e.g., $C_1$-$C_4$-alkylthio, is alkyl-S.

Aryl, e.g., $C_6$-$C_{18}$-aryl, $C_6$-$C_{10}$-aryl or $C_6$-$C_{12}$-aryl, may be within the given limits of carbon atoms phenyl, fluorenyl, biphenylyl, terphenylyl or naphthyl, which may have a fused ring, such as in indanyl. Preferred examples are phenyl, 1-naphthyl, 2-naphthyl, 3- or 4-biphenylyl. Each aryl may be unsubstituted or substituted one or more times.

Arylene, e.g., $C_6$-$C_{18}$-arylene, $C_6$-$C_{12}$-arylene, may be derived from above-defined aryl by abstracting a hydrogen atom from any ring carbon atom. Examples are o-phenylene, m-phenylene, p-phenylene, 1,4-naphthylene, or 2,6-naphthylene.

Heteroaryl may be $C_2$-$C_{18}$-heteroaryl, $C_2$-$C_{10}$-heteroaryl or $C_2$-$C_{12}$-heteroaryl, i.e., a ring with five to seven ring atoms, wherein nitrogen, oxygen or sulfur are the possible heteroatoms. Examples are within the given limits of carbon atoms thienyl, furyl, pyrrolyl, imidazolyl, pyrazolyl, thiazolyl, oxazolyl, pyridyl, triazinyl, pyrimidinyl, benzofuranyl, isobenzofuranyl, xanthenyl, dibenzofuranyl, bipyridyl, triazinyl, isoindolyl, indolyl, 3H-indolyl, quinoxalinyl, indazolyl, chinolyl, isochinolyl, phthalazinyl, naphthyridinyl, carbazolyl, benzoxazolyl, benzthiazolyl, benzisothiazol, benzimidazolyl, phenazinyl, phenothiazinyl, or phenoxazinyl. Each heteroaryl may be unsubstituted or substituted one or more times. The term "heteroaryl" may also include a combination of the above mentioned heteroaryl groups and arylene groups like 1,3-phenylene, 1,4-phenylene, 1,8-naphthylene, 1,4-naphthylene or 2,6-napthylene.

Heteroarylene, e.g., $C_2$-$C_{18}$-heteroarylene, $C_4$-$C_{10}$-heteroarylene, $C_2$-$C_{12}$-heteroarylene may be derived from above-defined heteroaryl by abstracting a hydrogen atom from any ring carbon atom of the heteroaryl.

Halogen (Hal) denotes I, Br, Cl, or F, preferably Cl on alkyl and Cl or Br on aryl.

Amine groups, for example, as represented by $NR^6R^7$, wherein $R^6$ and $R^7$ together are $C_4$-$C_6$-alkylene interrupted by O, S and/or $NR^{14}$, are cyclic amines, wherein $R^6$ and $R^7$ thus form, together with the nitrogen atom they are attached to, an aliphatic N-heterocyclic residue comprising 4 to 6 ring carbon atoms, which may be optionally substituted by alkyl groups. Examples are morpholinyl, thiomorpholinyl, piperidinyl, pyrrolidinyl,

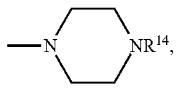

or a $C_1$-$C_4$-alkyl substituted variant thereof.

The term "aliphatic unit", as used herein, means a group derived from a linear hydrocarbon, which may be branched.

The term "cycloaliphatic unit", as used herein, means a group derived from a cyclic hydrocarbon, which may be substituted with alkyl.

The term "aromatic unit", as used herein, means a group derived from an aromatic compound.

The term "heteroaromatic unit", as used herein, means a group derived from a heteroaromatic compound.

The term "substituted" means "substituted one or more times with", that is 1 to 3 times, where possible, preferably 1 or 2 times, more preferably 1. If a substituent occurs more than once in a group, it may be different in each occurrence.

As used herein, the singular forms of the articles "a", "an" and "the" include plural forms unless the content clearly dictates otherwise.

The instant process provides a compound A having one or more groups of formula (I)

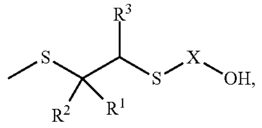

Preferably, X is $C_2$-$C_{12}$-alkylene or $C_2$-$C_{12}$-alkylene interrupted with O or S. More preferably, X is $C_2$-$C_6$-alkylene or $C_2$-$C_6$-alkylene interrupted with O or S, most preferably X is $C_2$-$C_4$-alkylene or $C_2$-$C_4$-alkylene interrupted with O or S, especially interrupted with S.

In a particular preferred embodiment, X is ethylene or propylene, especially ethylene.

Preferably, $R^1$ and $R^2$ are hydrogen and $R^3$ is hydrogen or $C_1$-$C_4$-alkyl, preferably hydrogen or methyl. In particular, $R^1$, $R^2$ and $R^3$ are hydrogen.

Accordingly, in a preferred aspect the invention relates to a process, wherein $R^1$ and $R^2$ are hydrogen, and $R^3$ is hydrogen or $C_1$-$C_4$-alkyl; and X is $C_2$-$C_6$-alkylene or $C_2$-$C_6$-alkylene interrupted with O or S, preferably interrupted with S.

The instant process provides preferably a compound A having n groups of formula (Ia)

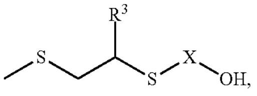

wherein $R^3$ is hydrogen or $CH_3$;

X is $C_2$-$C_4$-alkylene or $C_2$-$C_4$-alkylene interrupted with O or S, preferably $C_2$-$C_4$-alkylene or $C_2$-$C_4$-alkylene interrupted with S, and n is an integer of 1, 2, 3, 4, 5 or 6.

More preferably X is ethylene or propylene, most preferably ethylene.

Especially preferred is a process, wherein $R^1$ and $R^2$ are hydrogen, and $R^3$ is hydrogen or methyl, in particular $R^1$, $R^2$ and $R^3$ are hydrogen; and X is ethylene or propylene, in particular ethylene.

Particularly preferred is a process, wherein $R^1$, $R^2$ and $R^3$ are hydrogen; and X is ethylene.

Preferably, the invention relates to a process, wherein compound A having n groups of formula (I) is a compound of formula (III)

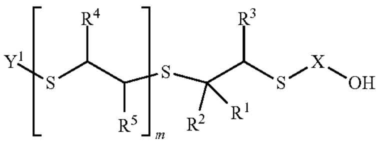

or (IV)

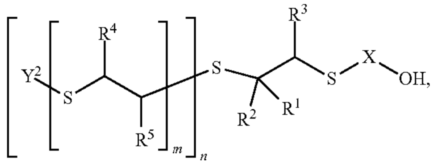

wherein $Y^1$ is $C_1$-$C_{18}$-alkyl; $C_1$-$C_{18}$-alkyl substituted with OH, $C_1$-$C_4$-alkoxy, $C_1$-$C_4$-alkylthio, halogen, $NR^6R^7$, $C_3$-$C_{18}$-cycloalkyl, $C_6$-$C_{18}$-aryl or $C_2$-$C_{18}$-heteroaryl, and/or interrupted with O, S, —SO—, —$SO_2$, —COO—, —OCOO—, —CO—, $C_3$-$C_{18}$-cycloalkylene, $C_6$-$C_{18}$-arylene or $C_2$-$C_{18}$-heteroarylene;

$C_3$-$C_{18}$-cycloalkyl; $C_3$-$C_{18}$-cycloalkyl substituted with OH, $C_1$-$C_4$-alkoxy, $C_1$-$C_4$-alkylthio, halogen or $NR^8R^9$ and/or interrupted by O or S;

$C_6$-$C_{18}$-aryl; $C_6$-$C_{12}$-aryl substituted with $C_1$-$C_{12}$-alkyl, OH, $C_1$-$C_4$-alkoxy, $C_1$-$C_4$-alkylthio, halogen, or $NR^{10}R^{11}$;

$C_2$-$C_{18}$-heteroaryl, $C_2$-$C_{18}$-heteroaryl substituted with $C_1$-$C_{12}$-alkyl, OH, $C_1$-$C_4$-alkoxy, $C_1$-$C_4$-alkylthio, halogen, or $NR^{12}R^{13}$;

$R^4$ and $R^5$ are independently of one another and at each occurrence hydrogen, $C_1$-$C_{18}$-alkyl, $C_1$-$C_{18}$-alkyl substituted with halogen or interrupted with O or S; $C_6$-$C_{18}$-aryl or $C_6$-$C_{12}$-aryl substituted with $C_1$-$C_4$-alkyl, $C_1$-$C_4$-alkoxy, $C_1$-$C_4$-alkylthio, or halogen;

$R^6$, $R^7$, $R^8$, $R^9$, $R^{10}$, $R^{11}$, $R^{12}$ and $R^{13}$ are independently of one another and at each occurrence $C_1$-$C_4$-alkyl, $C_1$-$C_4$-alkyl substituted with OH, $C_1$-$C_4$-alkoxy, $C_1$-$C_4$-alkylthio or halogen; $C_6$-$C_{10}$-aryl or $C_6$-$C_{10}$-aryl substituted with OH, $C_1$-$C_4$-alkoxy, $C_1$-$C_4$-alkylthio or halogen;

or $R^6$ and $R^7$, $R^8$ and $R^9$, $R^{10}$ and $R^{11}$, or $R^{12}$ and $R^{13}$ together are $C_4$-$C_6$-alkylene or $C_4$-$C_6$-alkylene interrupted by O, S and/or $NR^{14}$;

$R^{14}$ is $C_1$-$C_4$-alkyl;

m is at each occurrence 0 to 12;

$Y^2$ is a n-valent linking group; and n is an integer of 2, 3, 4, 5 or 6.

If m is greater than 1, m denotes the average number of groups —S—$CHR^4$—$CHR^5$—, present in one chain.

Structural isomers of compounds of formula (III) or (IV) containing a group —S—$CHR^5$—$CHR^4$— may also be obtained, but in a minor amount. For example, when m is greater than 1, mixtures of compounds of formula (III) or (IV) containing a group —S—$CHR^4$—$CHR^5$— and a group —S—$CHR^5$—$CHR^4$— may be obtained, wherein the latter is usually present in only minor amounts.

Preferably, $Y^1$ is $C_1$-$C_{12}$-alkyl; $C_1$-$C_{12}$-alkyl substituted with OH, $C_1$-$C_4$-alkoxy, $C_1$-$C_4$-alkylthio, halogen, $NR^6R^7$, $C_5$-$C_6$-cycloalkyl, $C_6$-$C_{12}$-aryl or $C_2$-$C_{10}$-heteroaryl, and/or interrupted with O, S, —SO—, —$SO_2$, —COO—, —OCOO—, —CO—, $C_6$-$C_8$-cycloalkylene, $C_6$-$C_{12}$-arylene or $C_4$-$C_{10}$-heteroarylene;

$C_5$-$C_8$-cycloalkyl; $C_5$-$C_8$-cycloalkyl substituted with OH, $C_1$-$C_4$-alkoxy, $C_1$-$C_4$-alkylthio, halogen or $NR^8R^9$, and/or interrupted by O or S;

$C_6$-$C_{12}$-aryl; $C_6$-$C_{10}$-aryl substituted with $C_1$-$C_6$-alkyl, OH, $C_1$-$C_4$-alkoxy, $C_1$-$C_4$-alkylthio, halogen, or $NR^{10}R^{11}$;

$C_2$-$C_{10}$-heteroaryl, $C_2$-$C_{10}$-heteroaryl substituted with $C_1$-$C_6$-alkyl, OH, $C_1$-$C_4$-alkoxy, $C_1$-$C_4$-alkylthio; halogen, or $NR^{12}R^{13}$;

$R^4$ and $R^5$ are independently of one another and at each occurrence hydrogen, $C_1$-$C_{18}$-alkyl, $C_1$-$C_{18}$-alkyl substituted with halogen and/or interrupted with O or S; $C_6$-$C_{18}$-aryl or $C_6$-$C_{12}$-aryl substituted with $C_1$-$C_4$-alkyl, $C_1$-$C_4$-alkoxy, $C_1$-$C_4$-alkylthio, or halogen; and $R^6$, $R^7$, $R^8$, $R^9$, $R^{10}$, $R^{11}$, $R^{12}$ and $R^{13}$ are independently of one another and at each occurrence $C_1$-$C_4$-alkyl, $C_1$-$C_4$-alkyl substituted with OH or phenyl.

More preferably $R^6$ and $R^7$, $R^8$ and $R^9$, $R^{10}$ and $R^{11}$, and $R^{12}$ and $R^{13}$ are identical and $C_1$-$C_4$-alkyl or $C_1$-$C_4$-alkyl substituted with OH.

Most preferably, $Y^1$ is $C_1$-$C_{12}$-alkyl; $C_1$-$C_{12}$-alkyl substituted with OH, $C_1$-$C_4$-alkoxy, $C_1$-$C_4$-alkylthio, $C_5$-$C_6$-cycloalkyl, $C_6$-$C_{12}$-aryl or $C_2$-$C_{10}$-heteroaryl, and/or interrupted with O, S, $C_6$-$C_8$-cycloalkylene, $C_6$-$C_{12}$-arylene or $C_4$-$C_{10}$-heteroarylene;

$C_5$-$C_8$-cycloalkyl; $C_5$-$C_8$-cycloalkyl substituted with OH, $C_1$-$C_4$-alkoxy, $C_1$-$C_4$-alkylthio, and/or interrupted by O or S;

$C_6$-$C_{12}$-aryl; $C_6$-$C_{10}$-aryl substituted with $C_1$-$C_6$-alkyl, OH, $C_1$-$C_4$-alkoxy, or $C_1$-$C_4$-alkylthio;

$C_2$-$C_{10}$-heteroaryl, $C_2$-$C_{10}$-heteroaryl substituted with $C_1$-$C_6$-alkyl, OH, $C_1$-$C_4$-alkoxy, or $C_1$-$C_4$-alkylthio.

Especially, $Y^1$ is $C_1$-$C_{12}$-alkyl substituted with OH and interrupted with O or S, in particular interrupted with S.

Preferred is a process for preparing a compound A of formula (III), wherein m is 1 to 10, i.e., 1, 2, 3, 4, 5, 6, 7, 8, 9 or 10, more preferably 1 to 8, especially 2 to 6.

Especially, $R^4$ is hydrogen, and $R^5$ is at each occurrence hydrogen, $C_1$-$C_{18}$-alkyl, $C_1$-$C_{18}$-alkyl substituted with halogen and/or interrupted with O or S; $C_6$-$C_{18}$-aryl or $C_6$-$C_{12}$-aryl substituted with $C_1$-$C_4$-alkyl, $C_1$-$C_4$-alkoxy, $C_1$-$C_4$-alkylthio, or halogen.

Alternatively, $R^4$ and $R^5$ are independently of one another and at each occurrence hydrogen, $C_1$-$C_4$-alkyl, $C_1$-$C_4$-alkyl substituted with halogen or interrupted with O or S; $C_6$-$C_{12}$-aryl or $C_6$-$C_{12}$-aryl substituted with $C_1$-$C_4$-alkyl, $C_1$-$C_4$-alkoxy, $C_1$-$C_4$-alkylthio, or halogen.

Accordingly, the process for preparing a compound A of formula (III) or (IV) is preferred, wherein $R^4$ and $R^5$ are independently of one another and at each occurrence hydrogen, $C_1$-$C_4$-alkyl, $C_1$-$C_4$-alkyl substituted with halogen or interrupted with O or S; $C_6$-$C_{12}$-aryl or $C_6$-$C_{12}$-aryl substituted with $C_1$-$C_4$-alkyl, $C_1$-$C_4$-alkoxy, $C_1$-$C_4$-alkylthio, or halogen; and m is 1 to 10, preferably 1 to 8, especially 2 to 6.

In particular, $R^4$ is hydrogen and $R^5$ is at each occurrence hydrogen, $C_1$-$C_4$-alkyl, $C_1$-$C_4$-alkyl substituted with halogen or interrupted with O or S; $C_6$-$C_{12}$-aryl or $C_6$-$C_{12}$-aryl substituted with $C_1$-$C_4$-alkyl, $C_1$-$C_4$-alkoxy, $C_1$-$C_4$-alkylthio, or halogen; and m is 1 to 10, preferably 1 to 8, i.e., 1, 2, 3, 4, 5, 6, 7 or 8, especially 2 to 6.

The process for preparing a compound A of formula (III) or (IV) is more preferred, wherein $R^4$ is hydrogen and $R^5$ is at each occurrence hydrogen, $C_1$-$C_4$-alkyl, $C_1$-$C_4$-alkyl substituted with halogen or interrupted with O or S; or phenyl; and m is 1 to 8, especially 2 to 6.

Especially, the process for preparing a compound A of formula (III) or (IV) is preferred, wherein $R^4$ is hydrogen and $R^5$ is at each occurrence hydrogen or $C_1$-$C_4$-alkyl; and m is 1 to 8, in particular m is 1 to 6 or 2 to 6.

Accordingly, the process for preparing a compound A of formula (III) is further preferred, wherein $Y^1$ is $C_1$-$C_{12}$-alkyl; $C_1$-$C_{12}$-alkyl substituted with OH, $C_1$-$C_4$-alkoxy, $C_1$-$C_4$-alkylthio, $C_5$-$C_6$-cycloalkyl, $C_6$-$C_{12}$-aryl or $C_2$-$C_{10}$-heteroaryl, and/or interrupted with O, S, $C_6$-$C_8$-cycloalkylene, $C_6$-$C_{12}$-arylene or $C_4$-$C_{10}$-heteroarylene;

$C_5$-$C_8$-cycloalkyl; $C_5$-$C_8$-cycloalkyl substituted with OH, $C_1$-$C_4$-alkoxy, $C_1$-$C_4$-alkylthio, and/or interrupted by O or S;

$C_6$-$C_{12}$-aryl; $C_6$-$C_{10}$-aryl substituted with $C_1$-$C_6$-alkyl, OH, $C_1$-$C_4$-alkoxy, or $C_1$-$C_4$-alkylthio;

$C_2$-$C_{10}$-heteroaryl, $C_2$-$C_{10}$-heteroaryl substituted with $C_1$-$C_6$-alkyl, OH, $C_1$-$C_4$-alkoxy, or $C_1$-$C_4$-alkylthio;

$R^4$ is hydrogen and $R^5$ is at each occurrence hydrogen, $C_1$-$C_4$-alkyl, $C_1$-$C_4$-alkyl substituted with halogen or interrupted with O or S; $C_6$-$C_{12}$-aryl or $C_6$-$C_{12}$-aryl substituted with $C_1$-$C_4$-alkyl, $C_1$-$C_4$-alkoxy, $C_1$-$C_4$-alkylthio, or halogen; and m is 1 to 8, especially m is 1 to 6 or 2 to 6.

Alternatively preferred is a process for preparing a compound A of formula (III), wherein m is 0.

Accordingly, the process for preparing a compound A of formula (III) is preferred, wherein $Y^1$ is $C_1$-$C_{12}$-alkyl; $C_1$-$C_{12}$-alkyl substituted with OH, $C_1$-$C_4$-alkoxy, $C_1$-$C_4$-alkylthio, $C_5$-$C_6$-cycloalkyl, $C_6$-$C_{12}$-aryl or $C_2$-$C_{10}$-heteroaryl, and/or interrupted with O, S, $C_6$-$C_8$-cycloalkylene, $C_6$-$C_{12}$-arylene or $C_4$-$C_{10}$-heteroarylene;

$C_5$-$C_8$-cycloalkyl; $C_5$-$C_8$-cycloalkyl substituted with OH, $C_1$-$C_4$-alkoxy, $C_1$-$C_4$-alkylthio, and/or interrupted by O or S;

$C_6$-$C_{12}$-aryl; $C_6$-$C_{10}$-aryl substituted with $C_1$-$C_6$-alkyl, OH, $C_1$-$C_4$-alkoxy, or $C_1$-$C_4$-alkylthio;

$C_2$-$C_{10}$-heteroaryl, $C_2$-$C_{10}$-heteroaryl substituted with $C_1$-$C_6$-alkyl, OH, $C_1$-$C_4$-alkoxy, or $C_1$-$C_4$-alkylthio, and wherein m is 0.

Further preferred is a process for preparing a compound A of formula (III), wherein $Y^1$ is $C_1$-$C_{12}$-alkyl substituted with OH and interrupted with O or S, especially interrupted with S;

$R^4$ is hydrogen and $R^5$ is at each occurrence hydrogen, $C_1$-$C_4$-alkyl, $C_1$-$C_4$-alkyl substituted with halogen or interrupted with O or S; or phenyl; and m is 1 to 10, preferably 1 to 8, especially 2 to 6.

Especially preferred is a process for preparing a compound A of formula (III), wherein $R^4$ is hydrogen and $R^5$ is in each occurrence the same and hydrogen or $C_1$-$C_4$-alkyl.

The process may also provide a compound A having more groups of formula (I).

Accordingly, in a preferred aspect the invention relates to a process for preparing a compound A of formula (IV)

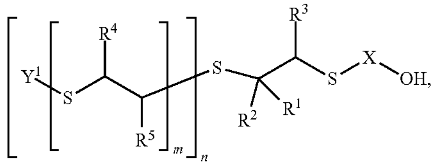

wherein $Y^2$ is a n-valent linking group,

X is $C_2$-$C_6$-alkylene or $C_2$-$C_6$-alkylene interrupted with O or S;

$R^1$, $R^2$ and $R^3$ are independently of one another hydrogen or $C_1$-$C_4$-alkyl; and n is an integer of 2, 3, 4, 5 or 6.

More preferred is a process for preparing a compound A of formula (IV), wherein $R^1$ and $R^2$ are hydrogen and $R^3$ is hydrogen or $C_1$-$C_4$-alkyl; and X is $C_2$-$C_6$-alkylene or $C_2$-$C_6$-alkylene interrupted with O or S.

Most preferred is a process for preparing a compound of formula (IV), wherein $R^1$ and $R^2$ are hydrogen and $R^3$ is hydrogen or $CH_3$; and X is $C_2$-$C_4$-alkylene or $C_2$-$C_4$-alkylene interrupted with O or S, preferably $C_2$-$C_4$-alkylene or $C_2$-$C_4$-alkylene interrupted with S.

The valence n is preferably an integer of 2, 3, 4 or 6, more preferably 2, 3 or 4, most preferably 2 or 3, especially 2.

Accordingly, in a preferred aspect the invention relates to a process for preparing a compound of formula (IV), wherein $Y^2$ is a n-valent linking group, and n is an integer of 2, 3, 4 or 6, especially 2, 3 or 4.

The n-valent linking group may comprise an aliphatic unit, a cycloaliphatic unit, an aromatic unit, and/or a heteroaromatic unit and optionally a functional group containing a heteroatom.

Accordingly, in a further preferred aspect the invention relates to a process for preparing a compound of formula (IV), wherein $Y^2$ is a n-valent linking group comprising an aliphatic unit, a cycloaliphatic unit, an aromatic unit, and/or a heteroaromatic unit and optionally a functional group containing a heteroatom; and n is an integer of 2, 3, 4 or 6, preferably 2, 3 or 4.

The functional group containing a heteroatom is a hetero-functional group selected from —O—, —S—, —SO—, —$SO_2$—, —COO—, —OCOO— or —CO—. The functional group containing a heteroatom may be part of the aliphatic unit, the cycloaliphatic unit, the aromatic unit and/or the heteroaromatic unit of the n-valent linking group and may be optionally present between at least one of said units.

When n is 2, $Y^2$ is a divalent linking group. The divalent linking group $Y^2$ may comprise an alkylene group, a cycloalkylene group, an arylene group and/or a heteroarylene group, and optionally at least one hetero-functional group selected from —O—, —S—, —SO—, —$SO_2$—, —COO—, —OCOO— or —CO—.

Preferably, the divalent linking group $Y^2$ comprises at least one group selected from $C_1$-$C_{18}$-alkylene; $C_1$-$C_{18}$-alkylene substituted with $C_1$-$C_4$-alkoxy, $C_1$-$C_4$-alkylthio, halogen, $NR^{15}R^{16}$, $C_5$-$C_{12}$-cycloalkyl, $C_6$-$C_{12}$-aryl, or $C_2$-$C_{12}$-heteroaryl;

$C_5$-$C_{12}$-cycloalkylene; $C_5$-$C_{12}$-cycloalkylene substituted with $C_1$-$C_4$-alkoxy, $C_1$-$C_4$-alkylthio, halogen or $NR^{17}R^{18}$ and/or interrupted with O or S; $C_6$-$C_{12}$-arylene; $C_6$-$C_{12}$-arylene substituted with $C_1$-$C_{12}$-alkyl, $C_1$-$C_4$-alkoxy, $C_1$-$C_4$-alkylthio, halogen, or $NR^{19}R^{20}$; $C_2$-$C_{12}$-heteroarylene; $C_2$-$C_{12}$-heteroarylene substituted with $C_1$-$C_{12}$-alkyl, $C_1$-$C_4$-alkoxy, $C_1$-$C_4$-alkylthio, halogen, or $NR^{21}R^{22}$; and optionally at least one hetero-functional group selected from —O—, —S—, —SO—, —$SO_2$—, —COO—, —OCOO— or —CO—; and $R^{15}$, $R^{16}$, $R^{17}$, $R^{18}$, $R^{19}$, $R^{20}$, $R^{21}$ and $R^{22}$ are independently of one another and at each occurrence $C_1$-$C_4$-alkyl, $C_1$-$C_4$-alkyl substituted with OH, $C_1$-$C_4$-alkoxy, $C_1$-$C_4$-alkylthio or halogen; $C_6$-$C_{10}$-aryl or $C_6$-$C_{10}$-aryl substituted with OH, $C_1$-$C_4$-alkoxy, $C_1$-$C_4$-alkylthio or halogen.

It is understood that the hetero-functional group selected from —O—, —S—, —SO—, —$SO_2$—, —COO—, —OCOO— or —CO— is not part of the alkylene group, the cycloalkylene group, the arylene group and/or the heteroarylene group.

The hetero-functional group is preferably selected from from —O—, —S— or —COO—, more preferably selected from —O— or —S—.

More preferably, the divalent linking group $Y^2$ comprises at least one group selected from $C_1$-$C_{18}$-alkylene; $C_5$-$C_{12}$-cycloalkylene; $C_5$-$C_{12}$-cycloalkylene interrupted with O or S; $C_6$-$C_{12}$-arylene; $C_6$-$C_{12}$-arylene substituted with $C_1$-$C_4$-alkyl, $C_2$-$C_{12}$-heteroarylene; or $C_2$-$C_{12}$-heteroarylene substituted with $C_1$-$C_4$-alkyl and optionally at least one group selected from —O—, —S— or —COO—.

Most preferably, the divalent linking group $Y^2$ comprises at least one group selected from $C_1$-$C_{12}$-alkylene; $C_5$-$C_8$-cycloalkylene; $C_5$-$C_8$-cycloalkylene interrupted with O or S; $C_6$-$C_{12}$-arylene; $C_6$-$C_{12}$-arylene substituted with $C_1$-$C_4$-alkyl; $C_2$-$C_{12}$-heteroarylene; or $C_2$-$C_{12}$-heteroarylene substituted with $C_1$-$C_4$-alkyl and optionally at least one hetero-functional group selected from —O—, —S— or —COO—, especially —O— or —S—.

Accordingly, in a preferred aspect the invention relates to a process for preparing a compound of formula (IV), wherein $Y^2$ is a divalent linking group, said divalent linking group comprises at least one group selected from $C_1$-$C_{12}$-alkylene; $C_5$-$C_8$-cycloalkylene; $C_5$-$C_8$-cycloalkylene interrupted with O or S; $C_6$-$C_{12}$-arylene; $C_6$-$C_{12}$-arylene substituted with $C_1$-$C_4$-alkyl, $C_2$-$C_{12}$-heteroarylene; or $C_2$-$C_{12}$-heteroarylene substituted with $C_1$-$C_4$-alkyl and optionally at least one group selected from —O—, —S— or —COO—, especially —O— or —S—.

The divalent linking group $Y^2$ may comprise one or more groups of $C_1$-$C_{18}$-alkylene of various length.

Examples of $C_1$-$C_{18}$-alkylene are methylene, ethylene, —$CHCH_3$—, —$C(CH_3)_2$—, 1,2-propylene, 1,3-propylene, 2,2-dimethyl-1,3-propylene, 2-butyl-2-ethyl-1,3-propylene, 1,4-butylene, 1,6-hexylene, 1,12-dodecylene, 1,16-hexadecylene.

Examples of a divalent group $Y^2$ include $C_1$-$C_{18}$-alkylene, —$CH_2$—O—$CH_2$—, —$CH_2$—S—$CH_2$—, —$(CH_2CH_2O)_p$—$CH_2CH_2$—, —$(CH_2CH_2S)_p$—$CH_2CH_2$— with p being an integer of 1 to 10, preferably 2 to 10, more preferably of 2 to 4, —$(C_3H_7O)_q$—$C_3H_7$—, —$(C_3H_7S)_q$—$C_3H_7$ with q being an integer of 1 to 10, preferably 1 to 4 or 2 to 4, o-phenylene, m-phenylene, p-

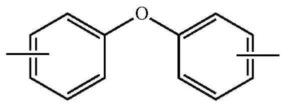, phenylene, 4,4'-isopropylidine-diphenylene,

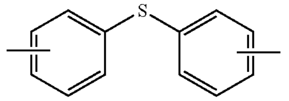 like

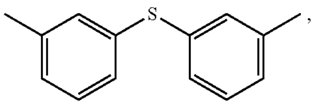,

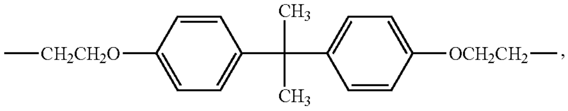,

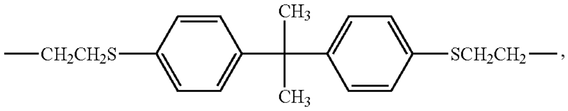,

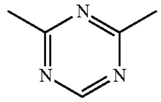, and 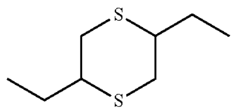.

When n is 3, $Y^2$ is a trivalent linking group, preferably derived from benzene (i.e., benzenetriyl), triazintriyl, methylidyne or a trivalent linking group composed of either benzenetriyl, methylidyne or nitrogen and at least one divalent group, as described herein-before.

More preferably, $Y^2$ is a trivalent linking group selected from benzenetriyl, triazintriyl, methylidyne or a trivalent linking group composed of either benzenetriyl, triazintriyl, or methylidyne and at least one divalent group selected from $C_1$-$C_{12}$-alkylene and optionally at least one hetero-functional group selected from —O—, —S— or —COO—.

Examples of a trivalent linking group are

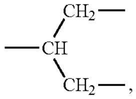, 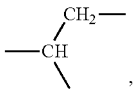, 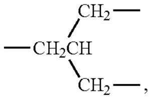,

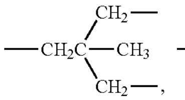, 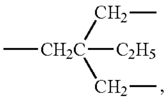, 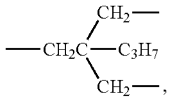,

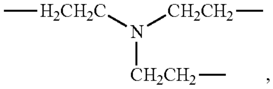, 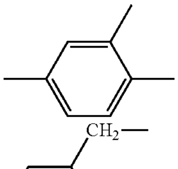,

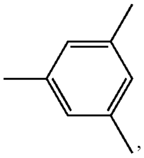, 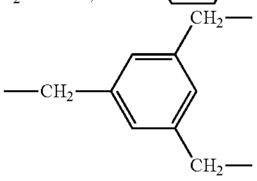,

-continued

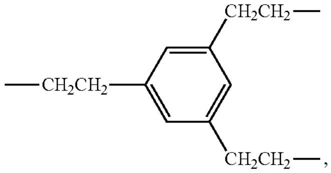

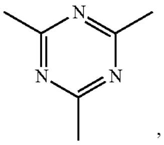

,

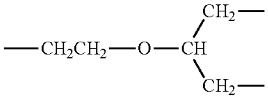

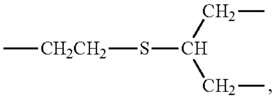

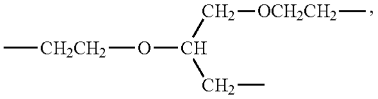

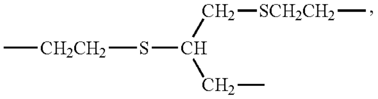

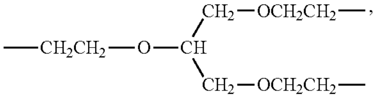

or

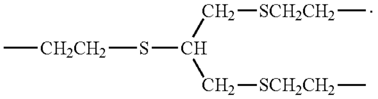

When n is 4, $Y^2$ is a tetravalent linking group, preferably derived from methane or benzene or a tetravalent linking group composed of the one derived from methane or benzene and at least one divalent linking group, as described herein-before.

More preferably, $Y^2$ is a tetravalent linking group derived from methane or benzene or a tetravalent linking group composed of the one derived from methane or benzene and at least one divalent group selected from $C_1$-$C_{12}$-alkylene and optionally at least one group selected from —O—, —S— or —COO—.

Examples of a tetravalent group are

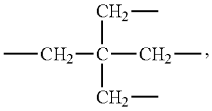

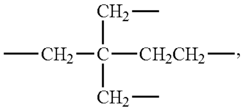

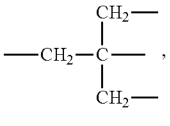

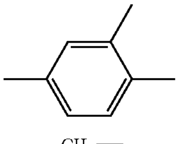

and

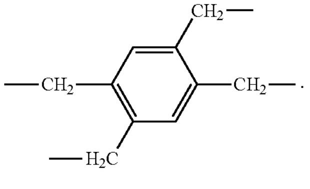

Penta- or hexavalent linking groups may be derived from penta- or hexa-sugar alcohols, such as xylitol, ribitol, sorbitol, mannitol or galacticol.

A further example of a hexavalent linking group is

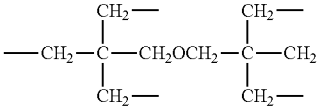

In a further preferred aspect, the invention relates to a process of preparing a compound of formula (IV), wherein $Y^2$ is a trivalent linking group selected from benzenetriyl, triazintriyl, methylidyne or a trivalent linking group composed of either benzenetriyl, methylidyne or nitrogen and at least one divalent group, or $Y^2$ is a tetravalent linking group derived from methane or benzene, or a tetravalent linking group composed of the one derived from methane or benzene and at least one divalent group, or $Y^2$ is a hexavalent group of formula

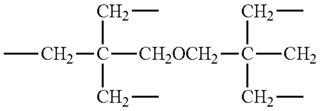

and optionally at least one divalent group, said divalent group is at each occurrence selected from $C_1$-$C_{12}$-alkylene and optionally at least one group selected from —O—, —S— or —COO—.

In a further preferred aspect, the invention relates to a process of preparing a compound of formula (IV), wherein $Y^2$ is a divalent linking group, said divalent linking group comprises at least one group selected from $C_1$-$C_1$-alkylene, $—CH_2—O—CH_2—$, $—CH_2—S—CH_2—$, $—(CH_2CH_2O)_p—CH_2CH_2—$, $—(CH_2CH_2S)_p—CH_2CH_2—$ with p being an integer of 1 to 10, preferably 2 to 10, $—(C_3H_7O)_q—C_3H_7$, $—(C_3H_7S)_q—C_3H_7$ with q being an integer of 1 to 10, o-phenylene, m-phenylene, p-

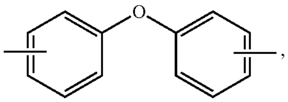

phenylene, 4,4'-isopropylidine-diphenylene,

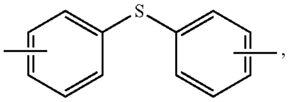

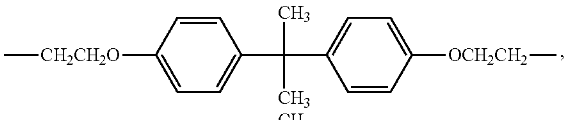

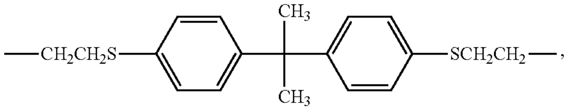

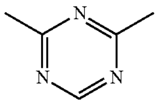

, and

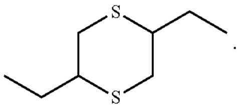

.

In a further preferred aspect, the invention relates to a process of preparing a compound of formula (IV), wherein $R^4$ is hydrogen, and $R^5$ is at each occurrence hydrogen, $C_1$-$C_4$-alkyl, $C_1$-$C_4$-alkyl substituted with halogen or interrupted with O or S; or phenyl; and m is 1 to 10, preferably 1 to 8, especially 2 to 6.

Monothiol compounds or polythiol compounds which may be used in the practice of the invention are commercially available or may be prepared by methods generally known in the art.

For example, compounds having alcohol groups may be converted to corresponding thiol compounds by reacting with thiourea in mineral acid followed by alkali hydrolysis, as described, for example, in EP 0378895 A1.

The preparation of isothiouronium salts by direct action of thiourea and halogen acids on alcohols is, for example, described by R. L. Frank et al., J. Am. Chem. Soc., 1946, 68, 10, 2103-2104. Alkylalcohols, thiourea and an access of 48% of hydrobromic or hydrochloric acid yields alkylthiols after refluxing for nine hours, followed by neutralization with NaOH. Thiols may be extracted with ether from the acidified mixture.

One pot rapid synthesis of thiols from alcohols under mild conditions is generally possible by using triphenyl phosphine, N-bromo-succinimide (NBS) and polymer supported hydrosulfide, as described, for example, by B. P. Bandgar et al., Synlett 2000, 6, 908-910. The formation of dialkylsulfides does not occur under these conditions, yields around 85% are possible.

Mercaptans may also be obtained from alcohols in moderate yields (44%) with $H_2S$ by using dicobalt octacarbonyl as a catalyst (CO, 60 bar, 150° C.), as described, for example, by H. Alper et al, J. Org. Chem.1988, 53, 3306-3309.

A monothiol compound B1 for the process of preparing a compound of formula (III) may be of general formula (VIII)

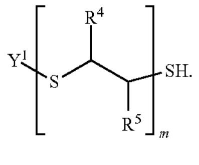

A preferred compound B1 of formula (Vill) is a compound, wherein $Y^1$ is $C_1$-$C_{18}$-alkyl; $C_1$-$C_{18}$-alkyl substituted with OH, $C_1$-$C_4$-alkoxy, $C_1$-$C_4$-alkylthio, halogen, $NR^6R^7$, $C_3$-$C_{18}$-cycloalkyl, $C_6$-$C_{18}$-aryl or $C_2$-$C_{18}$-heteroaryl, and/or interrupted with —O—, —S—, —SO—, —$SO_2$—, —COO—, —OCOO—, —CO—, $C_3$-$C_{18}$-cycloalkylene, $C_6$-$C_{18}$-arylene or $C_2$-$C_{18}$-heteroarylene;

$C_3$-$C_{18}$-cycloalkyl; $C_3$-$C_{18}$-cycloalkyl substituted with OH, $C_1$-$C_4$-alkoxy, $C_1$-$C_4$-alkylthio, halogen or $NR^8R^9$ and/or interrupted by O or S;

$C_6$-$C_{18}$-aryl; $C_6$-$C_{12}$-aryl substituted with $C_1$-$C_{12}$-alkyl, OH, $C_1$-$C_4$-alkoxy, $C_1$-$C_4$-alkylthio, halogen, or $NR^{10}R^{11}$;

$C_2$-$C_{18}$-heteroaryl, $C_2$-$C_{18}$-heteroaryl substituted with $C_1$-$C_{12}$-alkyl, OH, $C_1$-$C_4$-alkoxy, $C_1$-$C_4$-alkylthio, halogen, or $NR^{12}R^{13}$;

$R^4$ and $R^5$ are independently of one another and at each occurrence hydrogen, $C_1$-$C_{18}$-alkyl, $C_1$-$C_{18}$-alkyl substituted with halogen and/or interrupted with O or S; $C_6$-$C_{18}$-aryl or $C_6$-$C_{12}$-aryl substituted with $C_1$-$C_4$-alkyl, $C_1$-$C_4$-alkoxy, $C_1$-$C_4$-alkylthio, or halogen;

$R^6$, $R^7$, $R^8$, $R^9$, $R^{10}$, $R^{11}$, $R^{12}$ and $R^{13}$ are independently of one another and at each occurrence $C_1$-$C_4$-alkyl, $C_1$-$C_4$-alkyl substituted with OH, $C_1$-$C_4$-alkoxy, $C_1$-$C_4$-alkylthio or halogen; $C_6$-$C_{10}$-aryl or $C_6$-$C_{10}$-aryl substituted with OH, $C_1$-$C_4$-alkoxy, $C_1$-$C_4$-alkylthio or halogen;

or $R^6$ and $R^7$, $R^8$ and $R^9$, $R^{10}$ and $R^{11}$, or $R^{12}$ and $R^{13}$ together are $C_4$-$C_6$-alkylene or $C_4$-$C_6$-alkylene interrupted by O, S and/or $NR^{14}$;

$R^{14}$ is $C_1$-$C_4$-alkyl; and m is0 to 12.

More preferred is a compound B1 of formula $$Y^1\text{—SH} \quad \text{(V), wherein}$$

$Y^1$ is $C_1$-$C_{12}$-alkyl; $C_1$-$C_{12}$-alkyl substituted with OH, $C_1$-$C_4$-alkoxy, $C_1$-$C_4$-alkylthio, $C_5$-$C_6$-cycloalkyl, $C_6$-$C_{12}$-aryl or $C_2$-$C_{10}$-heteroaryl, and/or interrupted with O, S, $C_6$-$C_8$-cycloalkylene, $C_6$-$C_{12}$-arylene or $C_4$-$C_{10}$-heteroarylene;

$C_5$-$C_8$-cycloalkyl; $C_5$-$C_8$-cycloalkyl substituted with OH, $C_1$-$C_4$-alkoxy, $C_1$-$C_4$-alkylthio, and/or interrupted by O or S;

$C_6$-$C_{12}$-aryl; $C_6$-$C_{10}$-aryl substituted with $C_1$-$C_6$-alkyl, OH, $C_1$-$C_4$-alkoxy, or $C_1$-$C_4$-alkylthio;

$C_2$-$C_{10}$-heteroaryl, $C_2$-$C_{10}$-heteroaryl substituted with $C_1$-$C_6$-alkyl, OH, $C_1$-$C_4$-alkoxy, or $C_1$-$C_4$-alkylthio.

Most preferred is a compound B1 of formula (V), wherein $Y^1$ is $C_1$-$C_{12}$-alkyl substituted with OH and interrupted with O or S, especially interrupted with S.

Examples of suitable compounds are alkylmercaptans, like methylmercaptan or ethylmercaptan, arylmercaptans like thiophenol, and mercaptoalcohols, like mercaptoethanol, mercaptoglycerol or mercaptophenol.

Alternatively preferred is a compound B1 of formula (VIII), wherein $Y^1$ is $C_1$-$C_{12}$-alkyl; $C_1$-$C_{12}$-alkyl substituted with OH, $C_1$-$C_4$-alkoxy, $C_1$-$C_4$-alkylthio, $C_5$-$C_6$-cycloalkyl, $C_6$-$C_{12}$-aryl or $C_2$-$C_{10}$-heteroaryl, and/or interrupted with O, S, $C_6$-$C_8$-cycloalkylene, $C_6$-$C_{12}$-arylene or $C_4$-$C_{10}$-heteroarylene;

$C_5$-$C_8$-cycloalkyl; $C_5$-$C_8$-cycloalkyl substituted with OH, $C_1$-$C_4$-alkoxy, $C_1$-$C_4$-alkylthio, and/or interrupted by O or S;

$C_6$-$C_{12}$-aryl; $C_6$-$C_{10}$-aryl substituted with $C_1$-$C_6$-alkyl, OH, $C_1$-$C_4$-alkoxy, or $C_1$-$C_4$-alkylthio;

$C_2$-$C_{10}$-heteroaryl, $C_2$-$C_{10}$-heteroaryl substituted with $C_1$-$C_6$-alkyl, OH, $C_1$-$C_4$-alkoxy, or $C_1$-$C_4$-alkylthio;

$R^4$ and $R^5$ are independently of one another and at each occurrence hydrogen, $C_1$-$C_4$-alkyl, $C_1$-$C_4$-alkyl substituted with halogen or interrupted with O or S; $C_6$-$C_{12}$-aryl or $C_6$-$C_{12}$-aryl substituted with $C_1$-$C_4$-alkyl, $C_1$-$C_4$-alkoxy, $C_1$-$C_4$-alkylthio, or halogen; and m is 1 to 10.

Especially preferred is a compound B1 of formula (VIII), wherein $Y^1$ is $C_1$-$C_{12}$-alkyl substituted with OH and interrupted with O or S, especially interrupted with S;

$R^4$ is hydrogen and $R^5$ is at each occurrence hydrogen, $C_1$-$C_4$-alkyl, $C_1$-$C_4$-alkyl substituted with halogen or interrupted with O or S; or phenyl; and m is 1 to 8, especially 1 to 6.

Further preferred is a compound B1 of formula (VIII), wherein $Y^1$ is $C_1$-$C_{12}$-alkyl substituted with OH and interrupted with O or S, especially interrupted with S;

$R^4$ is hydrogen and $R^5$ is in each occurrence the same and hydrogen or $C_1$-$C_4$-alkyl; and m is 1 to 8, especially 1 to 6.

A polythiol compound B2 having at least two mercapto groups for the process of preparing a compound of formula (IV) may be of general formula (IX)

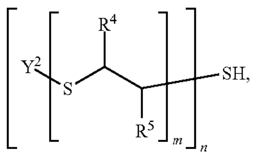

wherein $Y^2$ is a n-valent linking group comprising an aliphatic unit, a cycloaliphatic unit, an aromatic unit, and/or a heteroaromatic unit and optionally a functional group containing a heteroatom;

$R^4$ and $R^5$ are independently of one another and at each occurrence hydrogen, $C_1$-$C_{18}$-alkyl, $C_1$-$C_{18}$-alkyl substituted with halogen and/or interrupted with O or S; $C_6$-$C_{18}$-aryl or $C_6$-$C_{12}$-aryl substituted with $C_1$-$C_4$-alkyl, $C_1$-$C_4$-alkoxy, $C_1$-$C_4$-alkylthio, or halogen;

m is 0 to 12; and n is 2, 3, 4, 5 or 6, preferably n is 2, 3 or 4, more preferably n is 2 or 3.

A preferred compound B2 of formula (IX) is a compound, wherein $Y^2$ is a n-valent linking group comprising an aliphatic unit, a cycloaliphatic unit, an aromatic unit, and/or a heteroaromatic unit and optionally a functional group containing a heteroatom;

$R^4$ and $R^5$ are independently of one another and at each occurrence hydrogen, $C_1$-$C_4$-alkyl, $C_1$-$C_4$-alkyl substituted with halogen or interrupted with O or S; $C_6$-$C_{12}$-aryl or $C_6$-$C_{12}$-aryl substituted with $C_1$-$C_4$-alkyl, $C_1$-$C_4$-alkoxy, $C_1$-$C_4$-alkylthio, or halogen;

m is 0 to 10; and n is an integer of 2, 3, 4 or 6, preferably 2, 3 or 4, more preferably n is 2 or 3.

More preferred is a compound B2 of formula (IX), wherein $Y^2$ is a divalent linking group, said divalent linking group comprises at least one group selected from $C_1$-$C_{12}$-alkylene; $C_5$-$C_8$-cycloalkylene; $C_5$-$C_8$-cycloalkylene interrupted with O or S; $C_6$-$C_{12}$-arylene; $C_6$-$C_{12}$-arylene substituted with $C_1$-$C_4$-alkyl, $C_2$-$C_{12}$-heteroarylene; or $C_2$-$C_{12}$-heteroarylene substituted with $C_1$-$C_4$-alkyl and optionally at least one group selected from —O—, —S— or —COO—, especially —O— or —S—.

Also more preferred is a compound B2 of formula (IX), wherein $Y^2$ is a trivalent linking group selected from benzenetriyl, triazintriyl, methylidyne or a trivalent linking group composed of either benzenetriyl, methylidyne or nitrogen and at least one divalent group, or a tetravalent linking group derived from methane or benzene, or a tetravalent linking group composed of the one derived from methane or benzene and at least one divalent group, said divalent group is at each occurrence selected from $C_1$-$C_{12}$-alkylene and optionally at least one group selected from —O—, —S— or —COO—.

Also more preferred is a compound B2 of formula (IX), wherein $Y^2$ is a trivalent linking group selected from benzenetriyl, triazintriyl, methylidyne or a trivalent linking group composed of either benzenetriyl, methylidyne or nitrogen and at least one divalent group, or $Y^2$ is a tetravalent linking group derived from methane or benzene, or a tetravalent linking group composed of the one derived from methane or benzene and at least one divalent group, or $Y^2$ is a hexavalent group of formula

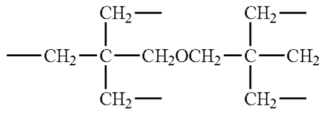

and optionally at least one divalent group, said divalent group is at each occurrence selected from $C_1$-$C_{12}$-alkylene and optionally at least one group selected from —O—, —S— or —COO—.

Examples of suitable dithiol compounds B2 include 1,2-dimercaptoethane, 2,2-dimercaptopropane, 1,3-dimercaptopropane, 1,4-dimercaptobutane, 1,6-dimercapto-hexane, tetra(ethylene glycol)dithiol, 3,6-dioxa-1,8-octane-dithiol, 2,2'-thiodiethanethiol, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,3,3-tetrakis(mercaptomethylthio)propane, 1,2-bis(2-mercaptoethylthio)ethane, 1,5-dimercapto-3-oxapentane, 2,2-dimethylpropane-1,3-dithiol, 2-mercaptomethyl-1,3-dimercaptopropane, benzenedimethanethiol (isomers), (1,1'-bihenyl)-4,4'dimethanethiol, 2-mercaptoethyl-ether, dimercaptobenzene (isomers), terphenyldithiol, 1,4-bis(mercaptomethyl)cyclohexane, 1,4-dimercaptocyclohexane, 2,5-dimercaptothiophene, 2,5-dimercapto-1,3,4-thiadiazole, 2,4-dimercapto-s-triazolo-[4,3-b]-1,3-4-thiadiazole ($C_3H_2N_4S_3$), dithiocyanuric acid, bis(4-mercaptophenyl) sulfide, bis(4-mercaptophenyl)ether, 2-mercaptomethyl-1,4-dimercaptopropane, 2-(2-mercaptoethylthio)-1,3-dimercaptopropane, 1,2-bis(2-mercaptoethyl-thio)-3-mercaptopropane, ethyleneglycol dithioglycolate, ethyleneglycolbis(2-mercaptoacetate), ethyleneglycolbis(3-mercaptopropionate), 1,4-butanediolbis(2-mercaptoacetate), 1,4-butanediolbis(3-mercaptopropionate), 2,5-bis(mercaptomethyl)-1,4-dithiane, 2,5-bis(mercaptoethyl)-1,4-dithiane, 2,2-bis(4-mercaptophenyl)propane, bis(4-mercaptomethylphenyl)sulfide, bis(4-mercaptomethylphenyl)ether or 2,2-bis(4-mercaptomethylphenyl)propane.

Examples of suitable trithiol compounds include 1,3,5-trimercaptobenzene, 1,3,5-tris(mercaptomethyl)benzene, trimethylolpropane tri(3-mercaptopropionate), trimethylolpropane tris-(thioglycolate), 1,2,3-trimercaptopropane, trimethylol-propanetris(2-mercaptoacetate), trimethylolpropanetris(3-mercaptopropionate), trithiocyanuric acid (TMT)=1,3,5-triazine-2,4,6-trithiol; or 1,1,1-tris(mercaptomethyl)-propane.

Examples of tetrathiol compounds include pentaerythritol tetrakis-(thioglycolate), pentaerythritoltetrakis(2-mercaptoacetate), pentaerythritoltetrakis(3-mercaptopropionate), 1,1,3,3-tetrakis(mercaptomethylthio)propane, or tetrakis (mercaptomethyl)-methane.

Compound C of formula (II) may be commercially available or may be obtained by methods known in the art. For example, vinyl mercaptoethanol is commercially available.

Generally, vinyl thioether may be obtained by the Reppe process by reacting a compound with a thiol group with acetylene in the presence of a basic catalyst, as described, for example, in US 2003/0105353 A1.

Vinyl thioether may also be obtained by conversion of mercaptoethanol with bromoethene in ethanol or tetrahydrofurane (THF) with sodium methoxide as basic catalyst, as described, for example, by A. Gubu et al., Chem. Eur. J., 2018, 24, 5895-5900.

Vinyl thioether may also be obtained by ring opening of 1,4-octathiane in dry THF by using Lithium diisopropylamine (LDA), as described, for example, by Y.-Y. Wang et al, J. Am. Chem. Soc. 2019, 141, 24, 9739-9745.

The process is usually conducted in an organic solvent, at an elevated temperature, under inert atmosphere and in the presence of a free radical generator.

Compound B and the compound C of formula (II) are generally dissolved in an appropriate amount of an organic solvent or water. The same solvents or different solvents may be used, preferably the same solvent is used.

Examples of suitable organic solvents are aprotic solvents, for example, ketones like butanone, 2-pentanone, 2-heptanone, 3-heptanone, cyclohexanone or methyl isobutyl ketone, aromatic solvents like toluene or xylenes, ethers like tetrahydrofuran, esters like ethyl acetate or butyl acetate, or amides like dimethyl formamide (DMF), dimethylacetamide or N-methyl-pyrrolidone (NMP), and the like. Preferred of them are ketones, ethers and esters.

Further examples of suitable solvents may be protic solvents, preferably alcohols like methanol, ethanol, propanol, isopropanol, butanol, ethylene glycol, propylene glycol, and the like, or water.

The solvents may be used individually or as a combination of two or more thereof.

In cases, where at least one of the reactants is liquid under the reaction conditions, the process may be performed without a solvent, provided that the reaction mixture will turn into a suspension or a homogenous solution during the process.

The process is usually conducted in the presence of a free radical generator. Essentially any type of free radical generator may be used to initiate the reaction. For example, a free radical generating chemical compound, ultraviolet light or radiation may be used. The radical initiator is generally used as a solution in an organic solvent.

Any radical initiator may be used, for example, an azo compound or a peroxygen compound. An azo compound is preferred.

Examples of suitable azo compounds are 2,2'-azobisisobutyronitrile (AIBN), 1,1'-azobis(cyclohexanecarbonitrile), 2,2'-azobis(2-methylbutyronitrile), dimethyl-azodiisobutyrate, 2-tert-butylazo-2-cyanopropane, and the like. Examples of suitable peroxygen compounds are potassium persulfate, ammonium persulfate, benzoyl peroxide, di-tert-butylperoxide, dicumyl peroxide, lauryl peroxide, cumene hydroperoxide, and the like.

The organic solvent may be the same as used for one of the compounds B and C, preferably the same.

The radical initiator may be used in a catalytically effective amount, for example, in an amount of from 0.0008 to 0.005 equivalents per thiol function to be reaction, preferably 0.001 to 0.004 equivalents.

The process is usually performed under inert atmosphere, for example, under nitrogen or argon atmosphere. If oxygen is present in the reaction mixture, the amount of the radical initiator should be increased to get a proper radical yield. For example, the catalytically effective amount of the radical initiator should be increased up to 500%, when 0.5 to 21% oxygen is present, up to 300%, when 0.5 to 10% oxygen is present, and up to 100%, when 0.5-5% is present.

Dependent on the radical generator the process is generally conducted at room temperature (20-23° C.) or at an elevated temperature, for example, at a temperature of from 30 to 130° C., preferably 40-120° C., and/or by irradiation with UV light. The reaction time is usually 15 min to 40 hours, preferably 1 to 12 hours.

The reaction is preferably performed such that compound B is provided in a suitable solvent under inert atmosphere at room temperature. The solution/suspension may then be heated to a temperature of from 40 to 130° C. Compound B of formula (II), usually dissolved in a solvent, may be slowly added at this temperature, preferably dropwise within a time period of 30 min and 8 hours. Usually, the solution of the radical initiator is added slowly and simultaneously. In general, the resulting mixture is stirred for several hours at an elevated temperature.

After cooling to room temperature, the product may be separated by conventional methods, for example, by filtration or evaporation.

Accordingly, in a preferred aspect the invention relates to a process for preparing a compound A, wherein the process is conducted at a temperature of from 30 to 130° C. and in the presence of a radical initiator.

The molar ratio of compound B having one —SH group to compound C of formula (II) is usually of from 0.8:1.2 to 1.2:0.8, preferably 0.85:1.15 to 1.15 to 0.85, more preferably 0.9:1.1 to 1.1:0.9, most preferably 0.95:1.05 to 1.05:0.95.

If a compound B having n —SH groups, wherein n is an integer of 2, 3, 4, 5 or 6, is reacted, compound C of formula (II) is usually used in an (0.85 s n s 1.15) equivalent amount, preferably (0.9 s n s 1.1), more preferably (0.95 s n s 1.05), based on one equivalent of compound B.

For example, if a compound B having two —SH groups is reacted, compound C of formula (II) is used in an amount of from 1.7 to 2.3 equivalents, preferably 1.8 to 2.2, more preferably 1.9 to 2.1).

In a further aspect, the invention relates to a compound A of formula (III)

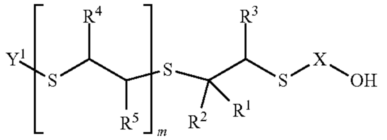

or (IV)

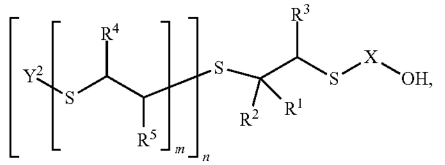

wherein $Y^1$ is $C_1$-$C_{18}$-alkyl; $C_1$-$C_{18}$-alkyl substituted with OH, $C_1$-$C_4$-alkoxy, $C_1$-$C_4$-alkylthio, halogen, $NR^6R^7$, $C_3$-$C_{18}$-cycloalkyl, $C_6$-$C_{18}$-aryl or $C_2$-$C_{18}$-heteroaryl, and/or interrupted with —O—, —S—, —SO—, —$SO_2$—, —COO—, —OCOO— or —CO—, $C_3$-$C_{18}$-cycloalkylene, $C_6$-$C_{18}$-arylene or $C_2$-$C_{18}$-heteroarylene;

$C_3$-$C_{18}$-cycloalkyl; $C_3$-$C_{18}$-cycloalkyl substituted with OH, $C_1$-$C_4$-alkoxy, $C_1$-$C_4$-alkylthio, halogen or $NR^8R^9$ and/or interrupted by O or S;

$C_6$-$C_{18}$-aryl; $C_6$-$C_{12}$-aryl substituted with $C_1$-$C_{12}$-alkyl, OH, $C_1$-$C_4$-alkoxy, $C_1$-$C_4$-alkylthio, halogen, or $NR^{10}R^{11}$;

$C_2$-$C_{18}$-heteroaryl, $C_2$-$C_{18}$-heteroaryl substituted with $C_1$-$C_{12}$-alkyl, OH, $C_1$-$C_4$-alkoxy, $C_1$-$C_4$-alkylthio, halogen, or $NR^{12}R^{13}$;

X is $C_2$-$C_{12}$-alkylene or $C_2$-$C_{12}$-alkylene substituted with $C_1$-$C_4$-alkoxy, $C_1$-$C_4$-alkylthio and/or interrupted with O or S;

$R^1$, $R^2$ and $R^3$ are independently of one another hydrogen or $C_1$-$C_4$-alkyl;

$R^4$ and $R^5$ are independently of one another and at each occurrence hydrogen, $C_1$-$C_{18}$-alkyl, $C_1$-$C_{18}$-alkyl substituted with halogen or interrupted with O or S; $C_6$-$C_{18}$-aryl or $C_6$-$C_{12}$-aryl substituted with $C_1$-$C_4$-alkyl, $C_1$-$C_4$-alkoxy, $C_1$-$C_4$-alkylthio, or halogen;

$R^6$, $R^7$, $R^8$, $R^9$, $R^{10}$, $R^{11}$, $R^{12}$ and $R^{13}$ are independently of one another and at each occurrence $C_1$-$C_4$-alkyl, $C_1$-$C_4$-alkyl substituted with OH, $C_1$-$C_4$-alkoxy, $C_1$-$C_4$-alkylthio or halogen; $C_6$-$C_{10}$-aryl or $C_6$-$C_{10}$-aryl substituted with OH, $C_1$-$C_4$-alkoxy, $C_1$-$C_4$-alkylthio or halogen;

or $R^6$ and $R^7$, $R^8$ and $R^9$, $R^{10}$ and $R^{11}$, or $R^{12}$ and $R^{13}$ together are $C_4$-$C_6$-alkylene or $C_4$-$C_6$-alkylene interrupted by O, S and/or $NR^{14}$;

$R^{14}$ is $C_1$-$C_4$-alkyl;

m is at each occurrence 1 to 12, preferably 1 to 10, more preferably 1 to 8;

$Y^2$ is a n-valent linking group; and n is an integer of 2, 3, 4, 5 or 6, provided that $R^4$ and $R^5$ are not simultaneously H.

In a further aspect, the invention relates to a compound A of formula (III), $Y^1$ is $C_1$-$C_{18}$-alkyl; $C_1$-$C_{18}$-alkyl substituted with $C_1$-$C_4$-alkoxy, $C_1$-$C_4$-alkylthio, halogen, $NR^6R^7$, $C_3$-$C_{18}$-cycloalkyl, $C_6$-$C_{18}$-aryl or $C_2$-$C_{18}$-heteroaryl, and/or interrupted with —O—, —S—, —SO—, —$SO_2$—, —COO—, —OCOO— or —CO—, $C_3$-$C_{18}$-cycloalkylene, $C_6$-$C_{18}$-arylene or $C_2$-$C_{18}$-heteroarylene;

$C_3$-$C_{18}$-cycloalkyl; $C_3$-$C_{18}$-cycloalkyl substituted with OH, $C_1$-$C_4$-alkoxy, $C_1$-$C_4$-alkylthio, halogen or $NR^8R^9$ and/or interrupted by O or S;

$C_6$-$C_{18}$-aryl; $C_6$-$C_{12}$-aryl substituted with $C_1$-$C_{12}$-alkyl, OH, $C_1$-$C_4$-alkoxy, $C_1$-$C_4$-alkylthio, halogen, or $NR^{10}R^{11}$;

$C_2$-$C_{18}$-heteroaryl, $C_2$-$C_{18}$-heteroaryl substituted with $C_1$-$C_{12}$-alkyl, OH, $C_1$-$C_4$-alkoxy, $C_1$-$C_4$-alkylthio, halogen, or $NR^{12}R^{13}$;

X is $C_2$-$C_{12}$-alkylene or $C_2$-$C_{12}$-alkylene substituted with $C_1$-$C_4$-alkoxy, $C_1$-$C_4$-alkylthio and/or interrupted with O or S;

$R^1$, $R^2$ and $R^3$ are independently of one another hydrogen or $C_1$-$C_4$-alkyl; $R^4$ and $R^5$ are independently of one another and at each occurrence hydrogen, $C_1$-$C_{18}$-alkyl, $C_1$-$C_{18}$-alkyl substituted with halogen or interrupted with O or S; $C_6$-$C_{18}$-aryl or $C_6$-$C_{12}$-aryl substituted with $C_1$-$C_4$-alkyl, $C_1$-$C_4$-alkoxy, $C_1$-$C_4$-alkylthio, or halogen;

$R^6$, $R^7$, $R^8$, $R^9$, $R^{10}$, $R^{11}$, $R^{12}$ and $R^{13}$ are independently of one another and at each occurrence $C_1$-$C_4$-alkyl, $C_1$-$C_4$-alkyl substituted with OH, $C_1$-$C_4$-alkoxy, $C_1$-$C_4$-alkylthio or halogen; $C_6$-$C_{10}$-aryl or $C_6$-$C_{10}$-aryl substituted with OH, $C_1$-$C_4$-alkoxy, $C_1$-$C_4$-alkylthio or halogen;

or $R^6$ and $R^7$, $R^8$ and $R^9$, $R^{10}$ and $R^{11}$, or $R^{12}$ and $R^{13}$ together are $C_4$-$C_6$-alkylene or $C_4$-$C_6$-alkylene interrupted by O, S and/or $NR^{14}$;

$R^{14}$ is $C_1$-$C_4$-alkyl; and m is at each occurrence 1 to 12, preferably 1 to 10, more preferably 1 to 8.

Preferably, the compound A is of formula (III) or (IV), wherein $Y^1$ is $C_1$-$C_{12}$-alkyl; $C_1$-$C_{12}$-alkyl substituted with OH, $C_1$-$C_4$-alkoxy, $C_1$-$C_4$-alkylthio, $C_5$-$C_6$-cycloalkyl, $C_6$-$C_{12}$-aryl or $C_2$-$C_{10}$-heteroaryl, and/or interrupted with O, S, $C_6$-$C_8$-cycloalkylene, $C_6$-$C_{12}$-arylene or $C_4$-$C_{10}$-heteroarylene;

$C_5$-$C_8$-cycloalkyl; $C_5$-$C_8$-cycloalkyl substituted with OH, $C_1$-$C_4$-alkoxy, $C_1$-$C_4$-alkylthio, and/or interrupted by O or S;

$C_6$-$C_{12}$-aryl; $C_6$-$C_{10}$-aryl substituted with $C_1$-$C_6$-alkyl, OH, $C_1$-$C_4$-alkoxy, or $C_1$-$C_4$-alkylthio;

$C_2$-$C_{10}$-heteroaryl, $C_2$-$C_{10}$-heteroaryl substituted with $C_1$-$C_6$-alkyl, OH, $C_1$-$C_4$-alkoxy, or $C_1$-$C_4$-alkylthio;

$R^1$ and $R^2$ are hydrogen and $R^3$ is hydrogen or $C_1$-$C_4$-alkyl; and

X is $C_2$-$C_6$-alkylene or $C_2$-$C_6$-alkylene interrupted with O or S;

$R^4$ and $R^5$ are independently of one another and at each occurrence hydrogen, $C_1$-$C_4$-alkyl, $C_1$-$C_4$-alkyl substituted with halogen or interrupted with O or S; $C_6$-$C_{12}$-aryl or $C_6$-$C_{12}$-aryl substituted with $C_1$-$C_4$-alkyl, $C_1$-$C_4$-alkoxy, $C_1$-$C_4$-alkylthio, or halogen; and m is 1 to 10, especially 1 to 8, in particular 2 to 6, provided that $R^4$ and $R^5$ are not simultaneously H.

Preferably, the compound A is of formula (III), wherein $Y^1$ is $C_1$-$C_{12}$-alkyl; $C_1$-$C_{12}$-alkyl substituted with $C_1$-$C_4$-alkoxy, $C_1$-$C_4$-alkylthio, $C_5$-$C_6$-cycloalkyl, $C_6$-$C_{12}$-aryl or $C_2$-$C_{10}$-heteroaryl, and/or interrupted with O, S, $C_6$-$C_8$-cycloalkylene, $C_6$-$C_{12}$-arylene or $C_4$-$C_{10}$-heteroarylene;

$C_5$-$C_8$-cycloalkyl; $C_5$-$C_8$-cycloalkyl substituted with OH, $C_1$-$C_4$-alkoxy, $C_1$-$C_4$-alkylthio, and/or interrupted by O or S;

$C_6$-$C_{12}$-aryl; $C_6$-$C_{10}$-aryl substituted with $C_1$-$C_6$-alkyl, OH, $C_1$-$C_4$-alkoxy, or $C_1$-$C_4$-alkylthio;

$C_2$-$C_{10}$-heteroaryl, $C_2$-$C_{10}$-heteroaryl substituted with $C_1$-$C_6$-alkyl, OH, $C_1$-$C_4$-alkoxy, or $C_1$-$C_4$-alkylthio;

$R^1$ and $R^2$ are hydrogen and $R^3$ is hydrogen or $C_1$-$C_4$-alkyl; and

X is $C_2$-$C_6$-alkylene or $C_2$-$C_6$-alkylene interrupted with O or S;

$R^4$ and $R^5$ are independently of one another and at each occurrence hydrogen, $C_1$-$C_4$-alkyl, $C_1$-$C_4$-alkyl substituted with halogen or interrupted with O or S; $C_6$-$C_{12}$-aryl or $C_6$-$C_{12}$-aryl substituted with $C_1$-$C_4$-alkyl, $C_1$-$C_4$-alkoxy, $C_1$-$C_4$-alkylthio, or halogen; and m is 1 to 10.

Further preferred, the compound A is of formula (III) or (IV), wherein $Y^1$ is $C_1$-$C_{12}$-alkyl substituted with OH and interrupted with O or S, especially interrupted with S;

$R^1$ and $R^2$ are hydrogen and $R^3$ is hydrogen or $C_1$-$C_4$-alkyl; and

X is $C_2$-$C_6$-alkylene or $C_2$-$C_6$-alkylene interrupted with O or S;

$R^4$ is hydrogen and $R^5$ is at each occurrence hydrogen, $C_1$-$C_4$-alkyl, $C_1$-$C_4$-alkyl substituted with halogen or interrupted with O or S; or phenyl; and m is 1 to 10, especially 1 to 8, in particular 2 to 6, provided that $R^4$ and $R^5$ are not simultaneously H.

Especially preferred is a compound A of formula (III) or (IV), wherein $Y^1$ is $C_1$-$C_{12}$-alkyl substituted with OH and interrupted with O or S, especially interrupted with S;

$R^1$ and $R^2$ are hydrogen and $R^3$ is hydrogen or $C_1$-$C_4$-alkyl; and

X is $C_2$-$C_6$-alkylene or $C_2$-$C_6$-alkylene interrupted with O or S;

$R^4$ is hydrogen and $R^5$ is in each occurrence the same and hydrogen or $C_1$-$C_4$-alkyl; and m is 1 to 8, especially 1 to 6, in particular 2 to 6, provided that $R^4$ and $R^5$ are not simultaneously H.

In a further aspect, the invention relates to a compound A of formula (IV), wherein $R^1$ and $R^2$ are hydrogen, and $R^3$ is hydrogen or $C_1$-$C_4$-alkyl; and X is $C_2$-$C_6$-alkylene or $C_2$-$C_6$-alkylene interrupted with O or S;

$R^4$ is hydrogen and $R^5$ is at each occurrence hydrogen, $C_1$-$C_4$-alkyl, $C_1$-$C_4$-alkyl substituted with halogen or interrupted with O or S; or phenyl;

$Y^2$ is a n-valent linking group;

m is 2 to 6, and n is an integer of 2, 3, 4, 5 or 6.

A compound B1 of formula (VIII) or a compound B2 of formula (IX), wherein m is 1 to 10, preferably 1 to 8, more preferably 2 to 6, and n is 2 to 6, preferably 2, 3 or 4, may be prepared in accordance to the process described in PCT/EP2020/061400, obtainable from a cyclic monothiocarbonate compound of formula (VII)

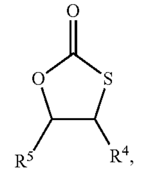

wherein $R^4$ and $R^5$ are as defined in any aspect herein-before.

Accordingly, a compound A of formula (III) is preferred, wherein m is 1 to 10, preferably 1 to 8, obtainable by a process, which process comprises a) reacting a thiol of formula $Y^1$—SH (V)

with a cyclic monothiocarbonate of formula (VII)

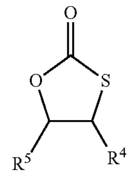

to form a compound B1 of formula (VIII)

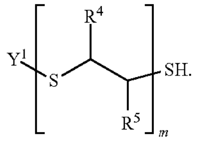

and b) reacting the compound B1 according to a process, as defined in any aspect herein-before, provided that $R^4$ and $R^5$ are not simultaneously H.

A compound B2 of formula (IX) may be prepared by reacting a thiol of formula $(Y^2)_n$—SH (VI), with a cyclic monothiocarbonate of formula (VII).

Accordingly, a compound A of formula (IV) is preferred, wherein m is 1 to 10, preferably 1 to 8, obtainable by a process, which process comprises a) reacting a thiol of formula $(Y^2)_n$—SH (VI)

to form a compound B2 of formula (IX)

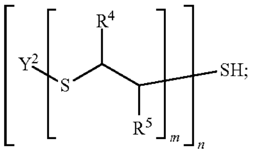

and b) reacting the compound B2 according to a process, as defined in any aspect herein-before, provided that $R^4$ and $R^5$ are not simultaneously H.

Preferred is a compound A of formula (III) or (IV), obtainable by a process, which process comprises a) reacting a thiol of formula $Y^1$—SH (V) or $(Y^2)_n$—SH (VI)

with a cyclic monothiocarbonate of formula (VII)

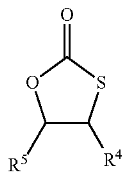

to form a compound B; and b) reacting compound B according to a process, as defined in any aspect herein, provided that $R^4$ and $R^5$ are not simultaneously H.

Accordingly, in a preferred aspect the invention relates to a compound A of formula (III) or (IV), obtainable by a process, the process comprising a) reacting a thiol of formula $Y^1—SH$ (V) or $(Y^2)_n—SH$ (VI)

with a cyclic monothiocarbonate of formula (VII)

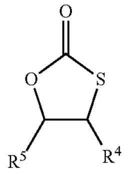

to form a compound B1 of formula (VIII)

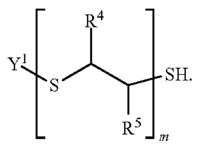

or a compound B2 of formula (IX)

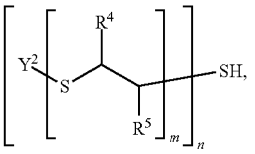

and b) reacting the compound B1 or B2 according to a process, as defined in any aspect herein, provided that $R^4$ and $R^5$ are not simultaneously H.

The cyclic monothiocarbonate is usually added in an amount of about (n×m) equivalents, based on one equivalent of the thiol of formula (VI).

The reaction may be conducted in the presence of a basic catalyst. Suitable catalysts are compounds with a tertiary amino group, a guanidino group, an amidine group or a phosphine group, or basic metal salts like a metal hydroxide, metal alkoxide from titanium or tin, for example, tetraalkylates or dialkyltin alkanoates, or a metal sulfide.

The cyclic monothiocarbonate is usually added in an amount of about m equivalents of one equivalent of the thiol of formula (V).

Suitable cyclic monothiocarbonate compounds are compounds of formula (VI), wherein $R^4$ and $R^5$ are hydrogen, $C_1$-$C_4$-alkyl, $CH_2C_1$, $CH_2O$-n$C_4H_9$, $CH_2O—C_{12}/C_{14}$ or phenyl, preferably hydrogen or $C_1$-$C_4$-alkyl, most preferably hydrogen or methyl. The substituent "$C_{12}/C_{14}$" means a substituent derived from $C_{12}/C_{14}$ fatty alcohol.

Preferred cyclic monothiocarbonates are compounds, wherein one of $R^4$ and $R^5$ is H and the other is hydrogen, $C_1$-$C_4$-alkyl, $CH_2C_1$, $CH_2O$-n$C_4H_9$, $CH_2O—C_{12}/C_{14}$ or phenyl.

More preferably, $R^5$ is hydrogen or $C_1$-$C_4$-alkyl, most preferably hydrogen or methyl.

Cyclic monothiocarbonates may be prepared in accordance with processes described in U.S. Pat. Nos. 3,072,676, 3,201,416 or WO 2019/034469 A1.

In a further aspect, the invention relates to the use of a compound A of formula (IV)

(IV)

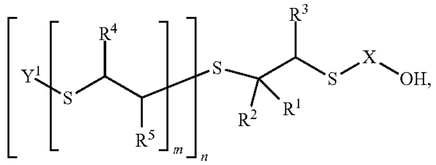

obtainable by a process, as defined in any aspect herein, wherein

X is $C_2$-$C_{12}$-alkylene or $C_2$-$C_{12}$-alkylene substituted with $C_1$-$C_4$-alkoxy, $C_1$-$C_4$-alkylthio and/or interrupted with O or S;

$R^1$, $R^2$ and $R^3$ are independently of one another hydrogen or $C_1$-$C_4$-alkyl;

$R^4$ and $R^5$ are independently of one another and at each occurrence hydrogen, $C_1$-$C_{18}$-alkyl, $C_1$-$C_{18}$-alkyl substituted with halogen or interrupted with O or S; $C_6$-$C_{18}$-aryl or $C_6$-$C_{12}$-aryl substituted with $C_1$-$C_4$-alkyl, $C_1$-$C_4$-alkoxy, $C_1$-$C_4$-alkylthio, or halogen;

m is at each occurrence 0 to 12;

$Y^2$ is a trivalent linking group selected from benzenetriyl, triazinetriyl, methylidyne or a trivalent linking group composed of either benzenetriyl, methylidyne or nitrogen and a divalent group, or $Y^2$ is a tetravalent linking group derived from methane or benzene or a tetravalent linking group composed of the one derived from methane or benzene and a divalent group, said divalent group is at each occurrence selected from $C_1$-$C_{12}$-alkylene and optionally at least one group selected from —O—, —S— or —COO—; or $Y^2$ is a divalent linking group, said divalent linking group comprises at least one group selected from $C_1$-$C_{18}$-alkylene, $—CH_2—O—CH_2—$, $—CH_2—S—CH_2—$, $—(CH_2CH_2O)_p—CH_2CH_2—$, $—(CH_2CH_2S)_p—CH_2CH_2—$ with p being an integer of 2 to 10, $—(C_3H_7O)_q—C_3H_7—$, $—(C_3H_7S)_q—C_3H_7—$ with q being an integer of 1 to 10, o-phenylene, m-phenylene, p-phenylene, 4,4'-isopropylidene-diphenylene,

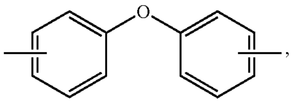

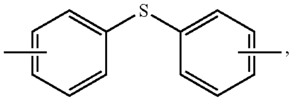

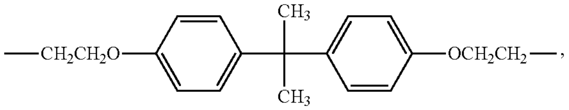

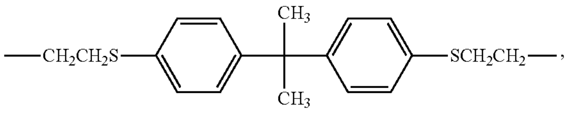

-continued

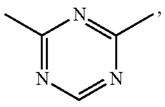

or;

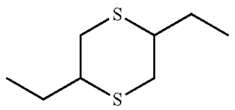

;

or of the compound of formula (IV), wherein $Y^2$ is a n-valent linking group;

provided that $R^4$ and $R^5$ are not simultaneously H, m is at each occurrence 1 to 12 and n is 2, 3 or 4;

as a chain extender or as a cross-linking agent.

Further, the invention relates to the use of compound A of formula (IV), wherein $R^1$ and $R^2$ are hydrogen, and $R^3$ is hydrogen or $C_1$-$C_4$-alkyl; and X is $C_2$-$C_6$-alkylene or $C_2$-$C_6$-alkylene interrupted with O or S;

$R^4$ is hydrogen and $R^5$ is at each occurrence hydrogen, $C_1$-$C_4$-alkyl, $C_1$-$C_4$-alkyl substituted with halogen or interrupted with O or S; or phenyl;

$Y^2$ is a n-valent linking group;

m is 2 to 6, and n is an integer of 2, 3, 4, 5 or 6;

as a chain extender or as a cross-linking agent.

Compound A of formula (IV) with n=2 is usually used as a chain extender, and compound A of formula (IV) with n=3, 4, 5 or 6, preferably n=3 or 4, is usually used as a cross-linking agent.

The process of the invention allows an easily available synthetic route to a mono-, di- and polyhydroxy-containing polythioether starting from a thiol group containing compound. The introduction of additional thioether groups in these compounds allows for greater stability of such compounds since the —SH function the starting compound is transformed into a —S— function, whereas the chain end of the resulting compound exhibits an OH-group which allows for more stability against oxidation.

Further, the instant process allows for an access to hydroxy-containing polythioethers to be used as building blocks in preparing a variety of polymers, especially as chain extenders or cross-linking agents. Said building blocks are suitably used in preparing a variety of polymers having improved properties like increased chemical stability and/or increased refractive index.

The instant hydroxy-containing polythioethers exhibit an improved storage stability in the presence of air, allowing, for example, an easy and safe handling.

Moreover, the hydroxy-containing polythioethers show a reduced odor compared to to the starting compounds and allows for more environmental friendly working conditions.

The definitions and preferences given for the process mentioned herein-before apply in any combination as well as in any combination for the other aspects of the invention.

The present invention will now be explained in more detail with reference to the following examples. These examples should not be construed as limited. Unless otherwise stated, "%" is always % by weight (wt %).

EXAMPLES

Example 1: Synthesis of 3,6-dithiaoctane-1,8-diol (X)

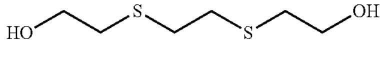

A solution of 2-mercaptoethanol (46.8 g; 0.6 mol) and methyl isobutyl ketone (90 g) was provided in a 500 ml reactor at room temperature (about 20-25° C.) and degassed with dry nitrogen within 15 min. The solution was heated to 80° C., followed by stirring and simultaneously adding dropwise a solution 1 of vinyl mercaptoethanol (62.55 g; 0.6 mol) and methyl isobutyl ketone (90 g) and a solution 2 of Wako V59 ((2,2'-azobis(isobutyronitrile), AIBN, Wako Specialty Chemicals) (117 mg, 0.71 mmol, 0.0012 eq.) and methyl isobutyl ketone (75 g). Solution 1 was added within 2 hours, and solution 2 was added within 4 hours. Then, the resulting mixture was stirred at 90° C. for 8 hours. After cooling to room temperature, the product was obtained by precipitation. The product of formula (X) was filtered off and recrystallized with toluene to obtain a white powder (87% yield, melting point 65° C.).

Example 2: Synthesis of 3,6,9-trithiaundecane-1,11-diol

2a) Synthesis of 3-thia-5-mercapto-1-pentanol

Vinyl mercaptoethanol (30 g, 288 mmol, 1 eq.) was placed in a round bottom flask and was diluted with MeOH (100 mL). To this solution thioacetic acid (22 g, 288 mmol, 1 eq.) was added. The flask was equipped with a reflux condenser and the mixture was stirred for 4 hours at 60° C. After that 30 mL aqueous HCl (10%) were added, and the mixture was allowed to stir until the reaction was finished. Chloroform and water were added to the reaction mixture. The pH of the aqueous phase was adjusted to pH=7 by using potassium carbonate. The chloroform phase was separated, and the extraction was repeated with chloroform twice. The combined chloroform phases were dried over calcium chloride. After evaporation of the chloroform in vacuum a colorless oil was yielded which was further exposed to oil pump vacuum at room temperature to remove traces of solvents and impurities. Yield 17.5 g (44%).

2b) Synthesis of 3,6,9-trithiaundecane-1,11-diol (XI)

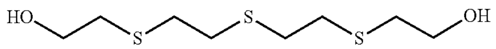

In a Schlenk tube 1.5 g of Example 2a (10.85 mmol, 1 eq.) was diluted with 20 mL isobutyl methyl ketone and degassed by bubbling nitrogen through the mixture, followed by adding vinyl mercaptoethanol (1.25 g, 11.93 mmol, 1.1 eq.), under nitrogen atmosphere. To start the reaction 5 mg of AIBN (0.03 mmol, 0.003 eq.) were added to the mixture. The Schlenk tube was sealed with a rubber septum and heated to 70° C., the mixture was stirred vigorously. After 10 min the product precipitated as a colorless solid. The solid was filtered off and recrystallized in toluene (83% yield, melting point 96° C.)

NMR $^1H$ (400 MHz, $d_6$-DMSO): δ [ppm]2.60 (4H, t, $C\underline{H}_2CH_2OH$), 2.72 (8H, d, $SC\underline{H}_2C\underline{H}_2S$), 3.52 (4H, dd, $C\underline{H}_2OH$), 4.75 (2H, t, $\underline{H}OCH_2$)

Example 3: Synthesis of 3,6,9,12-tetrathiatetradecane-1,14-diol (XII)

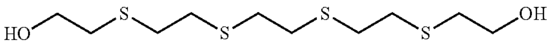

A solution of ethanedithiol (40 g; 0.425 mol) in methyl isobutyl ketone (90 g) was provided in a 1000 ml reactor at room temperature and degassed with dry nitrogen within 15 min. The solution was heated to 80° C., followed by stirring and simultaneously adding dropwise a solution 1 of vinyl mercaptoethanol (88.54 g; 0.84 mol) and methyl isobutyl ketone (120 g) and a solution 2 of Wako V59 (160 mg, 0.974 mmol) and methyl isobutyl ketone (90 g). Solution 1 was added within 2 hours, and solution 2 was added within 4 hours. Then, the resulting mixture was stirred at 90° C. for 8 hours. After cooling to room temperature, the product was obtained by precipitation. The product was filtered off and recrystallized with toluene to obtain a white powder (94% yield, melting point 114° C.).

NMR $^1H$ (400 MHz, $d_6$-DMSO): δ [ppm]2.61 (4H, t, $\underline{CH_2}CH_2OH$), 2.75 (12H, d, $S\underline{CH_2}\underline{CH_2}S$), 3.55 (4H, dd, $\underline{CH_2}OH$), 4.79 (2H, t, $\underline{H}OCH_2$)

NMR $^{13}C$ (100 MHz, $d_6$-DMSO): δ [ppm]31.9 ($\underline{C}H_2S\underline{C}H_2\underline{C}H_2S\underline{C}H_2$), 32.3 ($HOCH_2\underline{C}H_2$), 34.4 ($HOCH_2CH_2S\underline{C}H_2$), 61.5 ($HO\underline{C}H_2$)

Example 4

(XIII)

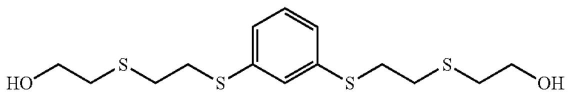

In a Schlenk tube 2 g of the benzene-1,3-dithiol (14 mmol) were diluted with 10 mL of isobutyl-methyl ketone and degassed by bubbling nitrogen through the mixture. To the mixture vinyl mercaptoethanol (3 g, 28 mmol) was added under nitrogen atmosphere. 23 mg of AIBN (0.14 mmol, 0.01 eq.) dissolved in isobutyl-methyl ketone were added to the mixture. The tube was sealed with a rubber septum and heated to 80° C. while the mixture was stirred vigorously. After 1 hour the reaction was completed, proven by $^1H$ NMR. The solvent was evaporated to give 4.6 g of a yellowish oil (93% crude yield). 1.5 g of the crude product was purified by column chromatography (silica using ethyl acetate and petroleum ether in an 80:20 mixture (vol/vol)). After evaporation of the solvent 2.2 g of a waxy colorless solid was formed (yield 72%).

Refractive index (determined with Abbe refractometer at 23° C.): 1.6401 Melting point: 42° C.

NMR $^1H$ (300 MHz, $CDCl_3$): δ [ppm]7.33-6.99 (m, 4H), 3.65 (q, J=5.8 Hz, 4H), 3.20-2.89 (m, 4H), 2.82-2.50 (m, 8H), 2.42-2.18 (t, 2H).

Example 5

(XIV)

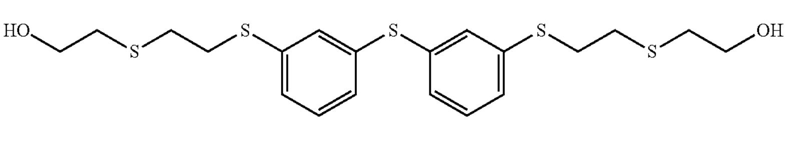

In a Schlenk tube 1 g of 4,4'-dimercapto diphenylsulfide (4 mmol) were diluted with 10 mL isobutyl-methyl ketone and degassed by bubbling nitrogen through the mixture. To the mixture 0.85 g of vinylmercaptoethanol (8 mmol) were added under nitrogen atmosphere. 15 mg of AIBN (0.009 mmol, 0.023 eq.), dissolved in isobutyl-methyl ketone were added to the mixture. The tube was sealed with a rubber septum and heated to 80° C. while the mixture was stirred vigorously. After 16 hours stirring at 80° C. the reaction mixture was cooled to 23° C. and the product precipitated as colorless crystalline solid which was filtered off and dried in vacuum at 50° C. (yield: 83%; melting point 130° C.)

NMR $^1H$ (300 MHz, $d_6$-DMSO): δ [ppm]7.41-7.16 (m, 8H), 4.79 (t, J=5.4 Hz, 2H), 3.64-3.42 (q, 4H), 3.25-3.09 (m, 4H), 2.83-2.68 (m, 4H), 2.62 (t, J=6.7 Hz, 4H).

Example 6

6a) The compound of formula (XVa) was prepared in analogy to the processes as described in EP 0378895 A1 and KR 20110021371 A.

(XVa)

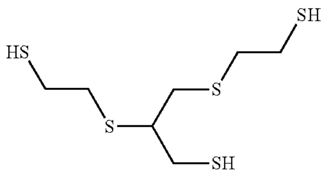

2-Mercaptoethanol (30 g; 384.5 mmol) was added dropwise at room temperature to a solution of NaOH (7.7 g) in 50 ml of water within 15 min under stirring. Epichlorohydrin (17.8 g; 192.2 mmol) was then added dropwise within 3 hours. HCl (37%, 80 g) and thiourea (54.2 g; 712 mmol) were added, and the resulting mixture was heated to 105° C. and stirred for 8 hours. After cooling to 50° C. toluene (90 ml) and aqueous ammonia (25%; 60 g) were added and stirred. The toluene phase was separated, washed with water and dried over calcium chloride. The solvent was removed by evaporation in vacuo to yield a transparent oil which was used in step 5b) without further purification. Yield 93%.

6b) A solution of the product of Example 6a) (50 g; 0.192 mol) in methyl isobutyl ketone (60 g) was provided in a 1000 ml reactor at room temperature and degassed with dry nitrogen within 15 min. The solution was heated to 80° C., followed by stirring and simultaneously adding dropwise a solution 1 of vinyl mercaptoethanol (60 g; 0.577 mol) and methyl isobutyl ketone (90 g) and a solution 2 of Wako V59 (100 mg) and methyl isobutyl ketone (60 g). Solution 1 was added within 2 hours, and solution 2 was added within 4 hours. Then, the resulting mixture was stirred at 80° C. for 8 hours, and the solvent was removed by evaporation in vacuo to obtain the product of formula (XVb) as an oil which solidified at room temperature to a waxy solid. Yield 90%; melting point 47° C.

$^1$H-NMR (400 MHz, $CDCl_3$): δ [ppm]2.66-2.92 (31H), 3.68 (6H, t, C$\underline{H}_2$OH).

(XVb)

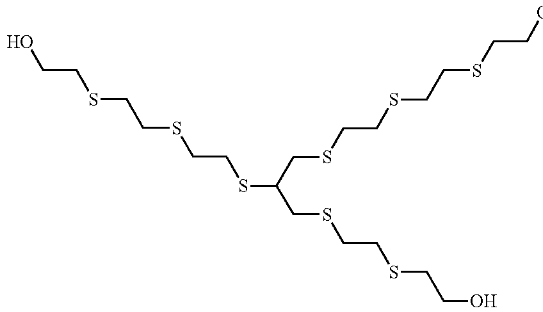

Example 7

7a) Synthesis of an Oligomeric Thioalcohol

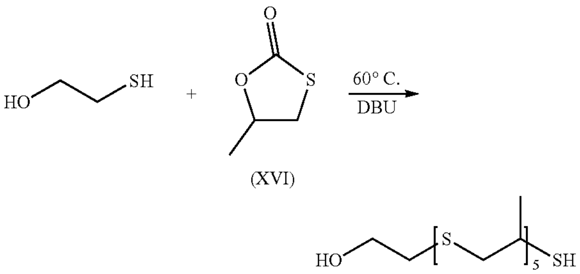

(XVI)

Mercaptoethanol (15 g; 192 mmol) and propylene-thiocarbonate of formula (XVI) (113 g; 960 mmol, 5 eq.) were mixed under stirring and heated to 60° C. Diazabicycloundecane (DBU) (1.5 g; 9.65 mmol) was added and stirred at 60° C. for 8 hours. After cooling to room temperature, the resulting transparent oil was used in step 4b) without further purification.

7b) Synthesis of an Oligothioetherdiol (XVII)

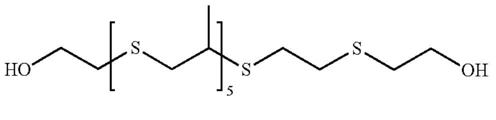

A solution of the product of Example 7a) (85 g; 0.188 mol) in methyl isobutyl ketone (90 g) was provided in a 1000 ml reactor at room temperature and degassed with dry nitrogen within 15 min. The solution was heated to 80° C., followed by stirring and simultaneously adding dropwise a solution 1 of vinyl mercaptoethanol (19.8 g; 0.188 mol) and methyl isobutyl ketone (60 g) and a solution 2 of Wako V59 (28 mg) and methyl isobutyl ketone (60 g). Solution 1 was added within 2 hours, and solution 2 was added within 4 hours. Then, the resulting mixture was stirred at 80° C. for 8 hours, and the solvent was removed by evaporation in vacuo to obtain the product as a brownish oil.

Refractive index $R_I$: 1.5550, measured at 24.5° C.

Molecular weight (SEC, THF as mobile phase, polystyrene standard): Mw=3430 Da; Mn=2720, Pd=1.26

The invention claimed is:

1. A process for preparing a compound A having n groups of formula (I)

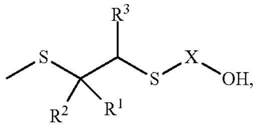

(I)

wherein

X is $C_2$-$C_{12}$-alkylene or $C_2$-$C_{12}$-alkylene substituted with $C_1$-$C_4$alkoxy, $C_1$-$C_4$-alkylthio, and/or interrupted with O or S;

$R^1$, $R^2$, and $R^3$ are independently of one another hydrogen or $C_1$-$C_4$-alkyl;

n is an integer of 1, 2, 3, 4, 5, or 6;

the process comprising:

reacting a compound B having n —SH groups with a compound C of formula (II)

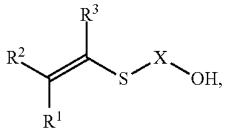

(II)

in the presence of a free radical generator, to obtain the compound A having n groups of formula (I).

2. The process according to claim 1, wherein $R^1$ and $R^2$ are hydrogen, $R^3$ is hydrogen or $C_1$-$C_4$-alkyl; and X is $C_2$-$C_6$-alkylene or $C_2$-$C_6$-alkylene interrupted with O or S.

3. The process according to claim 1, wherein the process is conducted at a temperature of from 30 to 130° C., and wherein the free radical generator is a radical initiator.

4. The process according to claim 1, wherein the compound A having n groups of formula (I) is a compound of formula (III) or (IV)

(III)

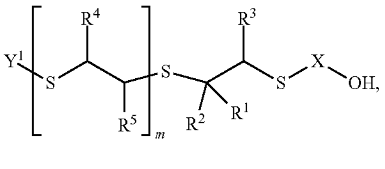

or

-continued (IV)

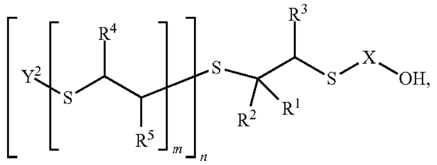

wherein $Y^1$ is $C_1$-$C_{18}$-alkyl; $C_1$-$C_{18}$-alkyl substituted with OH, $C_1$-$C_4$-alkoxy, $C_1$-$C_4$-alkylthio, halogen, $NR^6R^7$, $C_3$-$C_{18}$-cycloalkyl, $C_6$-$C_{18}$-aryl, or $C_2$-$C_{18}$-heteroaryl, and/or interrupted with O, S, —SO—, —$SO_2$, —COO—, —OCOO—, —CO—, $C_3$-$C_{18}$-cycloalkylene, $C_6$-$C_{18}$-arylene- or $C_2$-$C_{18}$-heteroarylene;

$C_3$-$C_{18}$-cycloalkyl; $C_3$-$C_{18}$-cycloalkyl substituted with OH, $C_1$-$C_4$-alkoxy, $C_1$-$C_4$-alkylthio, halogen, or $NR^8R^9$, and/or interrupted by O or S;

$C_6$-$C_{18}$-aryl; $C_6$-$C_{12}$-aryl substituted with $C_1$-$C_{12}$-alkyl, OH, $C_1$-$C_4$-alkoxy, $C_1$-$C_4$-alkylthio, halogen, or $NR^{10}R^{11}$;

$C_2$-$C_{18}$-heteroaryl, or $C_2$-$C_{18}$-heteroaryl substituted with $C_1$-$C_{12}$-alkyl, OH, $C_1$-$C_4$-alkoxy, $C_1$-$C_4$-alkylthio, halogen, or $NR^{12}R^{13}$;

$R^4$ and $R^5$ are independently of one another and at each occurrence hydrogen, $C_1$-$C_{18}$-alkyl, $C_1$-$C_{18}$-alkyl substituted with halogen or interrupted with O or S; $C_6$-$C_{18}$-aryl or $C_6$-$C_{12}$-aryl substituted with $C_1$-$C_4$-alkyl, $C_1$-$C_4$-alkoxy, $C_1$-$C_4$-alkylthio, or halogen;

$R^6$, $R^7$, $R^8$, $R^9$, $R^{10}$, $R^{11}$, $R^{12}$, and $R^{13}$ are independently of one another and at each occurrence $C_1$-$C_4$-alkyl, $C_1$-$C_4$-alkyl substituted with OH, $C_1$-$C_4$-alkoxy, $C_1$-$C_4$-alkylthio, or halogen; $C_6$-$C_{10}$-aryl or $C_6$-$C_{10}$-aryl substituted with OH, $C_1$-$C_4$-alkoxy, $C_1$-$C_4$-alkylthio, or halogen; or $R^6$ and $R^7$, $R^8$ and $R^9$, $R^{10}$ and $R^{11}$, or $R^{12}$ and $R^{13}$ together are $C_4$-$C_6$-alkylene or $C_4$-$C_6$-alkylene interrupted by O, S, and/or $NR^{14}$;

$R^{14}$ is $C_1$-$C_4$-alkyl;

m is at each occurrence 0 to 12;

$Y^2$ is a n-valent linking group; and n is an integer of 2, 3, 4, 5, or 6.

5. The process according to claim 4, wherein $R^4$ and $R^5$ are independently of one another and at each occurrence hydrogen, $C_1$-$C_4$-alkyl, $C_1$-$C_4$-alkyl substituted with halogen or interrupted with O or S; $C_6$-$C_{12}$-aryl or $C_6$-$C_{12}$-aryl substituted with $C_1$-$C_4$-alkyl, $C_1$-$C_4$-alkoxy, $C_1$-$C_4$-alkylthio, or halogen; and m is 1 to 10.

6. The process according to claim 4, wherein $Y^1$ is $C_1$-$C_{12}$-alkyl; $C_1$-$C_{12}$-alkyl substituted with OH, $C_1$-$C_4$-alkoxy, $C_1$-$C_4$-alkylthio, $C_5$-$C_6$-cycloalkyl, $C_6$-$C_{12}$-aryl, or $C_2$-$C_{10}$-heteroaryl, and/or interrupted with O, S, —SO—, —$SO_2$, —COO—, —OCOO—, —CO—, $C_6$-$C_8$-cycloalkylene, $C_6$-$C_{12}$-arylene, or $C_4$-$C_{10}$-heteroarylene;

$C_5$-$C_8$-cycloalkyl; $C_5$-$C_8$-cycloalkyl substituted with OH, $C_1$-$C_4$-alkoxy, $C_1$-$C_4$-alkylthio, and/or interrupted by O or S;

$C_6$-$C_{12}$-aryl; $C_6$-$C_{10}$-aryl substituted with $C_1$-$C_6$-alkyl, OH, $C_1$-$C_4$-alkoxy, or $C_1$-$C_4$-alkylthio;

$C_2$-$C_{10}$-heteroaryl, or $C_2$-$C_{10}$-heteroaryl substituted with $C_1$-$C_6$-alkyl, OH, $C_1$-$C_4$-alkoxy, or $C_1$-$C_4$-alkylthio; and m is 0.

7. The process according to claim 4, wherein $Y^1$ is $C_2$-$C_{12}$-alkyl substituted with OH and optionally interrupted with O or S;

$R^4$ is hydrogen and $R^5$ is at each occurrence hydrogen, $C_1$-$C_4$alkyl, $C_1$-$C_4$-alkyl substituted with halogen or interrupted with O or S; or phenyl; and m is 1 to 10.

8. The process according to claim 4, wherein $Y^2$ is a n-valent linking group comprising an aliphatic unit, a cycloaliphatic unit, an aromatic unit, and/or a heteroaromatic unit, and optionally comprising a functional group containing a heteroatom; and n is an integer of 2, 3, 4, or 6.

9. The process according to claim 4, wherein $Y^2$ is a divalent linking group, wherein said divalent linking group comprises at least one group selected from the group consisting of $C_1$-$C_{18}$-alkylene; $C_1$-$C_{18}$-alkylene substituted with $C_1$-$C_4$-alkoxy, $C_1$-$C_4$-alkylthio, halogen, $NR^{15}R^{16}$, $C_5$-$C_{12}$-cycloalkyl, $C_6$-$C_{12}$-aryl, or $C_2$-$C_{12}$-heteroaryl; $C_5$-$C_{12}$-cycloalkylene; $C_5$-$C_{12}$-cycloalkylene substituted with $C_1$-$C_4$-alkoxy, $C_1$-$C_4$-alkylthio, halogen or $NR^{17}R^{18}$, and/or interrupted with O or S; $C_6$-$C_{12}$-arylene; $C_6$-$C_{12}$-arylene substituted with $C_1$-$C_{12}$-alkyl, $C_1$-$C_4$-alkoxy, $C_1$-$C_4$-alkylthio, halogen, or $NR^{19}R^{20}$; $C_2$-$C_{12}$-heteroarylene; and $C_2$-$C_{12}$-heteroarylene substituted with $C_1$-$C_{12}$-alkyl, $C_1$-$C_4$-alkoxy, $C_1$-$C_4$-alkylthio, halogen, or $NR^{21}R^{22}$; and wherein said divalent linking group optionally comprises at least one hetero-functional group selected from the group consisting of —O—, —S—, —SO—, —$SO_2$, —COO—, —OCOO—, and —CO—; and $R^{15}$, $R^{16}$, $R^{17}$, $R^{18}$, $R^{19}$, $R^{20}$, $R^{21}$, and $R^{22}$ are independently of one another and at each occurrence $C_1$-$C_4$-alkyl, $C_1$-$C_4$-alkyl substituted with OH, $C_1$-$C_4$-alkoxy, $C_1$-$C_4$-alkylthio, or halogen; $C_6$-$C_{10}$-aryl or $C_6$-$C_{10}$-aryl substituted with OH, $C_1$-$C_4$-alkoxy, $C_1$-$C_4$-alkylthio, or halogen; and n is 2.

10. The process according to claim 4, wherein $Y^2$ is a divalent linking group, wherein said divalent linking group comprises at least one group selected from the group consisting of $C_1$-$C_{12}$-alkylene; $C_5$-$C_8$-cycloalkylene; $C_5$-$C_8$-cycloalkylene interrupted with O or S; $C_6$-$C_{12}$-arylene; $C_6$-$C_{12}$-arylene substituted with $C_1$-$C_4$-alkyl; $C_2$-$C_{12}$-heteroarylene; and $C_2$-$C_{12}$-heteroarylene substituted with $C_1$-$C_4$-alkyl, and wherein said divalent linking group optionally comprises at least one group selected from the group consisting of —O—, —S—, and —COO—.

11. The process according to claim 4, wherein $Y^2$ is a trivalent linking group selected from the group consisting of benzenetriyl, triazinetriyl, and methylidyne, or $Y^2$ is a trivalent linking group composed of either benzenetriyl, methylidyne, or nitrogen, and a divalent group, or $Y^2$ is a tetravalent linking group derived from methane or benzene, or a tetravalent linking group composed of the tetravalent linking group derived from methane or benzene and the divalent group, or $Y^2$ is a hexavalent group of formula

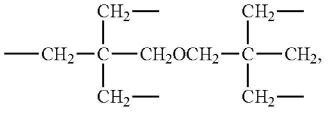

and optionally the divalent group, wherein said divalent group is at each occurrence a $C_1$-$C_{12}$-alkylene and optionally comprises at least one group selected from the group consisting of —O—, —S—, and —COO—.

12. The process according to claim 4, wherein $Y^2$ is a divalent linking group, wherein said divalent linking group comprises at least one group selected from the group consisting of $C_1$-$C_{18}$-alkylene, —$CH_2$—O—$CH_2$, —$CH_2$—S—$CH_2$—, —$(CH_2CH_2O)_p$—$CH_2CH_2$—, —$(CH_2CH_2S)_p$—$CH_2CH_2$— with p being an integer of 2 to 10, —$(C_3H_7O)_q$—$C_3H_7$—, —$(C_3H_7S)_q$—$C_3H_7$— with q being an integer of 1 to 10, o-phenylene, m-phenylene, p-phenylene,

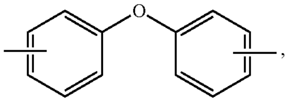

, 4,4′-isopropylidene-diphenylene,

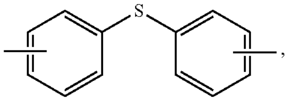

,

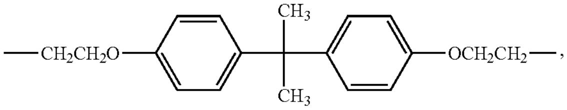

,

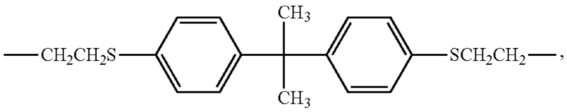

,

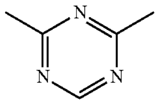

, and

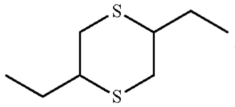

.

13. A compound A of formula (III) or (IV)

(III)

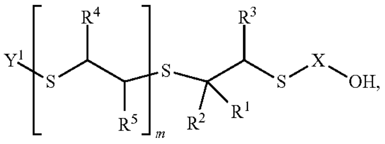

or (IV)

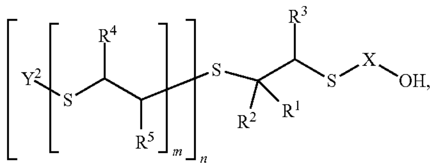

wherein $Y^1$ is $C_1$-$C_{18}$-alkyl substituted with OH, $C_1$-$C_4$-alkoxy, $C_1$-$C_4$-alkylthio, halogen, $NR^6R^7$, $C_3$-$C_{18}$-cycloalkyl, $C_6$-$C_{18}$-aryl, or $C_2$-$C_{18}$-heteroaryl, and/or interrupted with —O—, —S—, —SO—, —$SO_2$—, —COO—, —OCOO—, —CO—, $C_3$-$C_{18}$-cycloalkylene, $C_6$-$C_{18}$-arylene, or $C_2$-$C_{18}$-heteroarylene;

$C_3$-$C_{18}$-cycloalkyl; $C_3$-$C_{18}$-cycloalkyl substituted with OH, $C_1$-$C_4$-alkoxy, $C_1$-$C_4$-alkylthio, halogen, or $NR^8R^9$, and/or interrupted by O or S;

$C_6$-$C_{18}$-aryl; $C_6$-$C_{12}$-aryl substituted with $C_1$-$C_{12}$-alkyl, OH, $C_1$-$C_4$-alkoxy, $C_1$-$C_4$-alkylthio, halogen, or $NR^{10}R^{11}$;

$C_2$-$C_{18}$-heteroaryl, or $C_2$-$C_{18}$-heteroaryl substituted with $C_1$-$C_{12}$-alkyl, OH, $C_1$-$C_4$-alkoxy, $C_1$-$C_4$-alkylthio, halogen, or $NR^{12}R^{13}$;

X is $C_2$-$C_{12}$-alkylene or $C_2$-$C_{12}$-alkylene substituted with $C_1$-$C_4$-alkoxy, $C_1$-$C_4$-alkylthio, and/or interrupted with O or S;

$R^1$, $R^2$, and $R^3$ are independently of one another hydrogen or $C_1$-$C_4$-alkyl;

$R^4$ and $R^5$ are independently of one another and at each occurrence hydrogen, $C_1$-$C_{18}$-alkyl, $C_1$-$C_{18}$-alkyl substituted with halogen or interrupted with O or S; $C_6$-$C_{18}$-aryl or $C_6$-$C_{12}$-aryl substituted with $C_1$-$C_4$-alkyl, $C_1$-$C_4$-alkoxy, $C_1$-$C_4$-alkylthio, or halogen;

$R^6$, $R^7$, $R^8$, $R^9$, $R^{10}$, $R^{11}$, $R^{12}$, and $R^{13}$ are independently of one another and at each occurrence $C_1$-$C_4$-alkyl, $C_1$-$C_4$-alkyl substituted with OH, $C_1$-$C_4$-alkoxy, $C_1$-$C_4$-alkylthio, or halogen; $C_6$-$C_{10}$-aryl or $C_6$-$C_{10}$-aryl substituted with OH, $C_1$-$C_4$-alkoxy, $C_1$-$C_4$-alkylthio, or halogen; or $R^6$ and $R^7$, $R^8$ and $R^9$, $R^{10}$ and $R^{11}$, or $R^{12}$ and $R^{13}$ together are $C_4$-$C_6$-alkylene or $C_4$-$C_6$-alkylene interrupted by O, S, and/or $NR^{14}$;

$R^{14}$ is $C_1$-$C_4$-alkyl;

m is at each occurrence 1 to 12;

$Y^2$ is a n-valent linking group; and n is an integer of 2, 3, 4, 5, or 6, provided that $R^4$ and $R^5$ are not simultaneously H.

14. The compound A according to claim 13, obtainable by a process comprising:

a) reacting a thiol of formula (V) or (VI)

$Y^1$—SH (V), or $(Y^2)_n$—SH (VI), with a cyclic monothiocarbonate of formula (VII)

(VII)

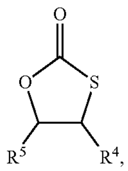

to form a compound B; and b) reacting compound B with a compound C of formula (II)

(II)

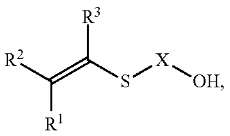

in the presence of a free radical generator.

15. A compound A of formula (IV)

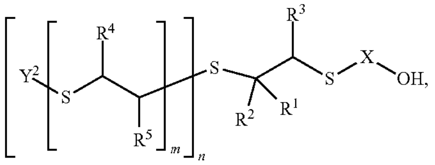

(IV)

wherein $R^1$ and $R^2$ are hydrogen, and $R^3$ is hydrogen or $C_1$-$C_4$-alkyl; and X is $C_2$-$C_6$-alkylene or $C_2$-$C_6$-alkylene interrupted with O or S;

$R^4$ is hydrogen and $R^5$ is at each occurrence hydrogen, $C_1$-$C_4$-alkyl, $C_1$-$C_4$-alkyl substituted with halogen or interrupted with O or S; or phenyl;

$Y^2$ is a n-valent linking group;

m is 2 to 6, and n is an integer of 2, 3, 4, 5, or 6.

16. A chain extender or cross-linking agent, comprising: the compound of formula (IV) as defined in claim 13.

17. The process according to claim 3, wherein the radical initiator is an azo compound.

18. The process according to claim 8, wherein n is an integer of 2, 3, or 4.

19. The process according to claim 10, wherein the divalent linking group comprises at least one selected from the group consisting of —O— and —S—.

20. The compound A according to claim 13, wherein m is at each occurrence 1 to 10.

* * * * *